United States Patent
Doi et al.

(10) Patent No.: US 7,787,493 B2
(45) Date of Patent: Aug. 31, 2010

(54) RADIO COMMUNICATION METHOD AND RADIO COMMUNICATION DEVICE

(75) Inventors: Hiroshi Doi, Kanagawa (JP); Yoshinori Watanabe, Tokyo (JP); Masahiro Mimura, Tokyo (JP)

(73) Assignee: Panasonic Corporation, Osaka (JP)

( * ) Notice: Subject to any disclaimer, the term of this patent is extended or adjusted under 35 U.S.C. 154(b) by 1008 days.

(21) Appl. No.: 10/573,506

(22) PCT Filed: May 30, 2005

(86) PCT No.: PCT/JP2005/009849

§ 371 (c)(1),
(2), (4) Date: Mar. 27, 2006

(87) PCT Pub. No.: WO2005/117354

PCT Pub. Date: Dec. 8, 2005

(65) Prior Publication Data

US 2008/0248768 A1   Oct. 9, 2008

(30) Foreign Application Priority Data

May 31, 2004  (JP) ............................. 2004-161052
May 20, 2005  (JP) ............................. 2005-147886

(51) Int. Cl.
*H04J 3/16* (2006.01)
(52) U.S. Cl. ............... 370/468; 455/450; 455/452.1
(58) Field of Classification Search ............... 370/311, 370/458, 445; 455/127.5
See application file for complete search history.

(56) References Cited

U.S. PATENT DOCUMENTS

| | | | | |
|---|---|---|---|---|
| 6,212,202 B1* | 4/2001 | Radimirsch et al. | ......... | 370/473 |
| 6,778,586 B1* | 8/2004 | Mano | ......................... | 375/130 |
| 7,103,371 B1* | 9/2006 | Liu | ........................... | 455/456.4 |
| 2002/0159426 A1 | 10/2002 | Kanemoto et al. | | |
| 2004/0066762 A1* | 4/2004 | Alastalo | ...................... | 370/329 |
| 2004/0109497 A1* | 6/2004 | Koval | .......................... | 375/222 |

(Continued)

FOREIGN PATENT DOCUMENTS

CN       1366748 A       8/2002

(Continued)

OTHER PUBLICATIONS

International Search Report corresponding to International Application No. PCT/JP2005/009849, dated Aug. 23, 2005.

*Primary Examiner*—Lester Kincaid
*Assistant Examiner*—Marcos Batista
(74) *Attorney, Agent, or Firm*—RatnerPrestia

(57) ABSTRACT

A first receiving unit typically receives a control frame in a narrowband channel. A communication data selection unit controls power saving of a second receiving unit performing reception in a UWB channel, based on the control frame. A communication data generation unit generates communication time reservation response information by adding information reporting a normal reception to the received request for communication time reservation, and transmits this information from transmitting units in the narrowband channel, so that a second receiving unit is set to an operating mode only during a time slot when UWB communication is performed, and use of the time slot for performing UWB communication is reported to the radio communication device which has made the communication request and the radio communication devices in the area where transmission is possible.

6 Claims, 21 Drawing Sheets

U.S. PATENT DOCUMENTS

2009/0122775 A1 * 5/2009 Haartsen .................. 370/338

FOREIGN PATENT DOCUMENTS

| JP | 2002-223479 | 8/2002 |
| JP | 2003-229869 | 8/2003 |
| JP | 2004-040373 | 2/2004 |
| JP | 2004-128616 | 4/2004 |

* cited by examiner

FIG.8

| SOURCE ID | DESTINATION ID | START TIME OF USE | TRANSMISSION OCCUPIED TIME | FRAME ID | RECEPTION CHANNEL ID |
|---|---|---|---|---|---|
| 24b4d7458a26 | 7814d72ef139 | 12 | 79 | 0006 | 1 |

| SOURCE ID | DESTINATION ID | START TIME OF USE | TRANSMISSION OCCUPIED TIME | FRAME ID | RESPONSE |
|---|---|---|---|---|---|
| 51b4e821a6f4 | 75a4c143df45 | 07 | 69 | 0014 | 0 |

901, 902, 903, 904, 905, 906

RADIO COMMUNICATION METHOD AND RADIO COMMUNICATION DEVICE

This is a U.S. National Phase Application of PCT International Application PCT/JP2005/009849 dated May 30, 2005.

FIELD OF THE INVENTION

The present invention relates to a radio communication method and a radio communication device when performing ad hoc communication in a radio communication network.

BACKGROUND ART

Conventional radio communication methods and radio communication devices when performing ad hoc communication include those disclosed in JP-A-2003-229869. FIG. 22 shows a radio communication method described in JP-A-2003-229869.

In FIG. 22, a radio communication device sets a management information notification cycle at a predetermined time interval and transmits management information in which reception timing information indicating a start position for the radio communication device to receive information, reception window information and reception cycle information are written. Another radio communication device which could receive the management information stores the reception timing, the reception window and the reception cycle by associating them with a communication device number of the radio communication device in question. When transmitting information, the reception start position in the communication device in question is found from the reception timing, the reception window and the reception cycle of the correspondent node, and information is sent according to that timing.

As another conventional example, there is a radio communication device disclosed in JP-A-2004-128616. FIG. 21 is a block diagram showing a configuration of the radio communication device disclosed in JP-A-2004-128616.

In FIG. 21, the conventional radio communication device is provided with a narrowband radio device 2002 and an antenna 2001 which use an ad hoc network system, in addition to a pulse radio device 2004 and an antenna 2003 for pulse communication, and performs transmission and reception of control data such as a request between radio communication terminals by using the narrowband radio device 2002. In this manner, the conventional radio communication device updates schedule information for data communication and performs data communication using a pulse communication format in accordance with that schedule information.

However, in the conventional method disclosed in JP-A-2003-229869, the radio communication device can wait for data frames only during the time the reception window is open, thereby allowing low power consumption, but the reception window receiving transmission requests is designated, so that there is a problem that transmission requests from plural radio communication devices concentrate in the reception window and the possibility that the device can not correctly receive the transmission request may increase.

Since communication requests or communication responses which are not addressed to the device miss the reception window of the device, the device can not receive them. Therefore, there is a problem that the device cannot know time slots of the expanded reception windows in which other radio communication devices receive data. As a result, the possibility that the device transmits data in such time slots increases.

In the conventional radio communication device disclosed in JP-A-2004-128616, the narrowband radio device goes into a waiting mode depending on whether there is a radio communication device or not in the neighboring area, but the pulse radio device is always operating. Therefore, it is difficult to reduce power consumption of the conventional radio communication.

DISCLOSURE OF THE INVENTION

An object of the invention is to provide a radio communication method, a transmitter, a receiver and a radio communication device in which power consumption of the radio communication device in a reception waiting mode can be further reduced and collision among communication signals of other radio communication devices can be avoided.

A radio communication method of the invention, required to have, in addition to a first channel which is in a sleep mode at an initial stage, a second channel in which communication is always possible with lower power consumption than the first channel as channels in which a first radio communication device and a second radio communication device perform data communication, includes a step in which the first radio communication device transmits control information to the second radio communication device in the second channel, a step in which the second radio communication device receives the control information in the second channel and puts the first channel in a data reception ON mode, and a step in which after transmission and reception of data are performed in the first channel between the first radio communication device and the second radio communication device, the first channel is returned to the sleep mode.

According to this, the second radio communication device can reduce power consumption by using the lower power consumption second channel while waiting for data.

In the radio communication method of the invention, the first radio communication device and the second radio communication device are UWB radio communication devices, and while the first channel is a wideband transmission channel, the second channel is a narrowband transmission channel whose modulation and demodulation rates are set to be no more than predetermined values.

According to this, the modulation rate of the second channel is slower than the first channel, therefore, power consumption of the first to third radio communication devices during communication in the second channel can be made lower than power consumption in the first channel.

In the invention, control information of the radio communication method also includes a communication time reservation request information in which a time slot for performing data transmission is entered; includes a step in which if the communication time reservation request information included in the control information received by the second radio communication device is addressed to itself, it transmits second channel communication time reservation response information comprising information stating that a communication reservation addressed to itself has been received added to the communication time reservation request information in question, a step in which a third radio communication device located in an area in which communication is possible with the first radio communication device or the second radio communication device or both receives the communication time reservation request information from the first radio communication device or the communication time reservation response information from the second radio communication device or both in the second channel, and stores a time slot written in the communication time reservation request information or the communication time reservation response information a transmission prohibition time slot, and a step in which the third radio communication device decides a time slot in which its own transmission and reception are possible based on the stored transmission prohibition time slots; and in which the first radio communication device transmits data using the second channel, in the time slot designated by the communication time reservation request information.

According to this, the radio communication device which has received communication time reservation information transmits a response including the information of the reserved communication time to the neighborhood, and thereby radio communication devices located in the area in which communication is possible with the radio communication device to which communication is requested can know the time slot in which communication is reserved.

The radio communication method of the invention further includes a step in which the second radio communication device requests the first radio communication device to transmit communication time reservation information using the second channel. The first radio communication device transmits control information in response to a request from the second radio communication device in either the first channel or the second channel.

According to this, the second radio communication device can notify other radio communication devices in advance that the second channel can be used, therefore, it is possible to receive information in the second channel, in which reception has low power consumption.

In the radio communication method of the invention, the first radio communication device further performs multicasting to the second radio communication device in the second channel.

According to this, the first radio communication device can transmit communication time reservation information to all radio communication devices, with low power consumption.

A receiver of the invention includes a first receiving unit receiving a preamble in a narrowband channel in which reception is always possible, a second receiving unit receiving data in an UWB channel, which can save power, and a communication data selection unit controlling the power saving in the second receiving unit when the first receiving unit receives the preamble, in which the communication data selection unit makes the second receiving unit a power saving mode, and cancels the power saving in the second receiving unit when it receives a preamble from the first receiving unit and then receives data in the UWB channel.

According to this, the receiver of the invention causes the second receiving unit using the UWB channel to be the power saving mode except when performing data communication, and waits for reception of the preamble in the narrowband channel, in which communication is possible with lower power consumption than the UWB channel, when not performing the data communication. Therefore, power consumption of the receiver which performs UWB communication can be reduced as a whole. Also, the receiver of the invention can be applied to any protocol regardless of the communication format.

A receiver of the invention includes a first receiving unit receiving control information in a narrowband channel in which reception is always possible, a second receiving unit receiving data in an UWB channel which can save power, and a communication data selection unit controlling the power saving in the second receiving unit by judging whether the control information received by the first receiving unit is addressed to itself, in which the communication data selection unit puts the second receiving unit into a power saving mode, and cancels the power saving in the second receiving unit when receiving the control information addressed to itself from the first receiving unit, thereby receiving data in the UWB channel.

According to this, the receiver puts the second receiving unit using the UWB channel to be the power saving mode except when performing data communication, and waits for reception of control information in the narrowband channel, in which communication is possible with lower power consumption than the UWB channel. Therefore, power consumption of the receiver which performs an UWB communication can be reduced as a whole.

A transmitter of the invention includes a control information pulse generation unit outputting control information in pulses having a wide pulse width, a data pulse generation unit outputting transmission data as a pulse having a narrower pulse width than the control information pulse generation unit, an oscillator outputting an oscillation signal varying with the pulse width of the pulse inputted from the control information pulse generation unit and the data pulse generation unit, and a transmitting unit transmitting the signal outputted from the oscillator, so that the output band is switched by the oscillator outputting a signal of the narrowband channel in response to the pulse input from the control information pulse generation unit, or by outputting a signal of the UWB channel in response to a pulse input from the data pulse generation unit.

According to this, the transmitter of the invention can switch the output band with a simple configuration.

A radio communication device includes a receiver which has a first receiving unit receiving control information in a narrowband channel in which reception is always possible, a second receiving unit receiving data in an UWB channel which can save power, and a communication data selection unit controlling the power saving in the second receiving unit by judging from the control information received by the first receiving unit whether the received data is addressed to itself, in which the communication data selection unit puts the second receiving unit in a power saving mode and then when it receives the control information addressed to itself from the first receiving unit it cancels the power saving in the second receiving unit so as to receive data in the UWB channel, and a transmitter which has a control information pulse generation unit outputting control information in pulses having a wide pulse width, a data pulse generation unit outputting transmission data in pulses having a narrower pulse width than the control information pulse generation unit, an oscillator outputting an oscillation signal depending on the pulse width of the pulse inputted from the control information pulse generation unit and the data pulse generation unit and a transmitting unit transmitting the signal outputted from the oscillator, in which the output band is switched by the oscillator outputting a signal of a narrowband channel in response to a pulse input from the control information pulse generation unit, or by outputting a signal of an UWB channel owing to a pulse input from the data pulse generation unit. According to this, when the radio communication devices of the invention perform communication with each another, power consumption in the reception waiting mode can be suppressed, and therefore power consumption can be reduced as a whole.

The control information generated by the radio communication device of the invention includes communication time reservation request information in which a time slot for a source radio communication device to perform data transmission is written, and the receiver further has a communication information analysis unit which extracts the identifier of the source radio communication device and the reserved time slot for data transmission based on the communication time reservation request information, a communication reservation table in which the communication information analysis unit records the identifier and the reserved time slot so as to be linked with each other when the destination of control data is the receiver itself, and a response information generation unit which generates communication time reservation response information in which information notifying the normal reception of data is added to the communication time reservation request information, in which the control information pulse generation unit of the transmitter generates a pulse based on the communication time reservation response information generated by the response information generation unit, and the oscillator generates a signal of the narrowband channel depending on the pulse.

According to this, the radio communication device which has received communication time reservation information transmits a response including the reserved communication time information to its neighborhood, and thereby radio communication devices located in the area which can communicate with the radio communication device with which communication is requested can know the time slot in which communication is reserved.

In the radio communication device of the invention, the communication data selection unit allows the UWB channel to receive data only in the time slot reserved in the data transmission addressed to itself. Therefore, the time slot using the UWB channel can be limited to the minimum, and as a result power consumption can be further reduced.

In the radio communication device of the invention, the narrowband channel is a channel in which modulation and demodulation rates are set to be no more than predetermined values.

According to this, power consumption in the narrowband channel can be prevented from exceeding a prescribed value.

As described above, according to the invention, the transmitter can switch the band of its output signal with a simple configuration, and the receiver can receive a carrier sense signal while in a state of low power consumption. Further, plural radio communication devices can perform radio communication without interfering with one another.

BRIEF DESCRIPTION OF THE DRAWINGS

FIG. 8 is a table showing a communication prohibition table according to the embodiment 1 of the invention.

FIG. 9 is a table showing a communication reservation table according to the embodiment 1 of the invention.

Figure 1:
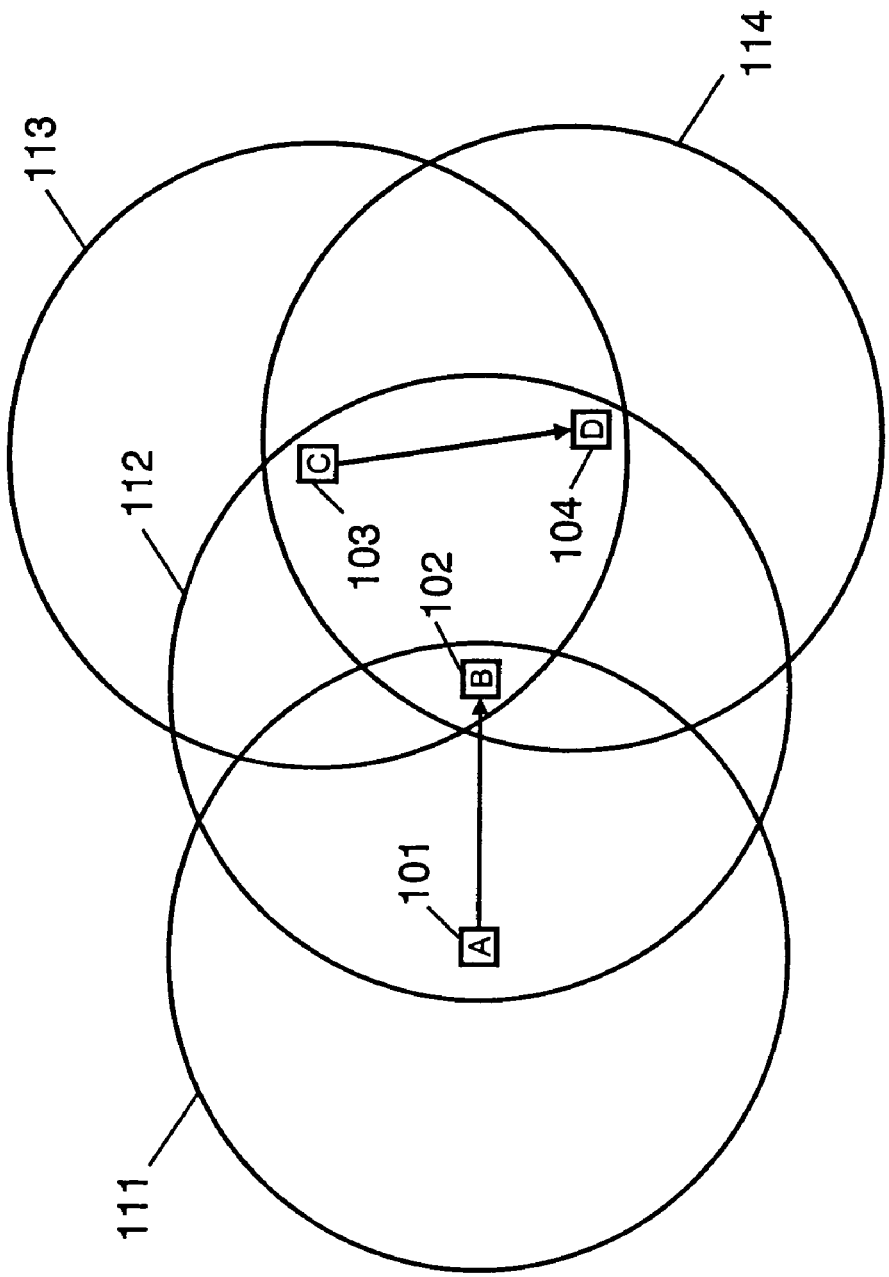
FIG. 1 is a view showing a configuration of a radio communication network according to an embodiment 1 of the invention.

DESCRIPTION OF REFERENCE NUMERALS 101, 102, 103, 104 radio communication device
111, 112, 113, 114 communicable area
200, 221, 222 antenna
201 receiving unit
202 communication data selection unit
203 application unit
204 communication information analysis unit
205 communication prohibition table
206 communication reservation table
207 communication/response information generation unit
209 event timer
210 communication data generation unit
211 transmitting unit
1401 narrowband transmitting unit
1402 narrowband receiving unit
1500 transmission function unit
1501 transmission signal generation unit
1502 CS signal generation unit
1503 data generation unit
1504 narrowband modulation unit
1505 wideband modulation unit
1506, 1516 amplifier
1507 antenna
1510 reception function unit
1511 demodulation unit
1512 data decoding unit
1513 carrier detection unit 1514 wideband demodulation unit
1515 narrowband demodulation unit
1517 power supply switch
1520 communication data generation unit
1604 first impulse waveform generation unit
1605 second impulse waveform generation unit
1607 oscillator
2001, 2003 antenna
2002 narrowband radio device
2004 pulse radio device

BEST MODE FOR CARRYING OUT THE INVENTION

Hereinafter, embodiments of the invention will be explained with reference to the drawings.

Embodiment 1

FIG. 1 is a view showing a configuration of a radio communication network according to embodiments of the invention.

In FIG. 1, radio communication devices 101 to 104 respectively perform multi-access format Ultra Wide Band (UWB) radio communication with other radio communication devices in communicable areas 111 to 114 respectively, and transmit data to the whole communicable area with a non-directional antenna in a UWB channel. The radio communication devices 101 to 104 can freely move in space.

Figure 2:
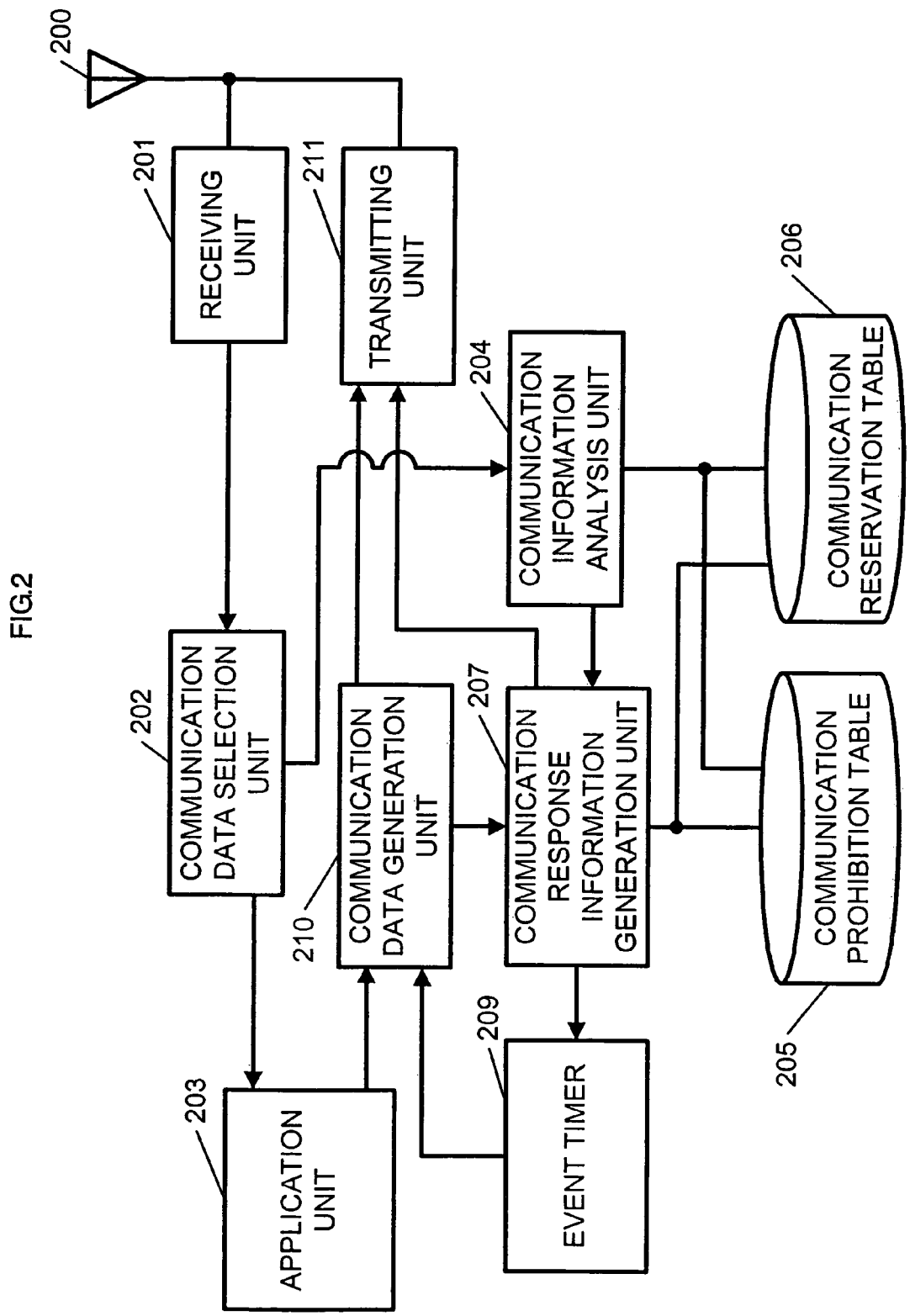
FIG. 2 is a diagram showing a configuration of a radio communication device according to the embodiment 1 of the invention.

FIG. 2 is a block diagram showing a configuration of the radio communication devices 101 to 104.

In FIG. 2, a receiving unit 201 converts analog signals received from an antenna 200 into digital signals and generate frames. The receiving unit 201 is in a state so that it always can receive signals. A transmitting unit 211 converts digital signal frames into analog signals and transmits the signals from the antenna 200. The antenna 200 is a non-directional antenna and radiates radio waves in the communicable area.

A communication data selection unit 202 identifies the frame type received by the receiving unit 201 from the antenna 200. Received frame types include a communication request RTS frame (hereinafter, referred to as an "RTS frame"), a communication confirmation signal CTS (hereinafter, referred to as a "CTS frame"), a communication non-confirmed signal nCTS (hereinafter, referred to as an "nCTS frame"), a data frame, and a Keep Alive frame.

Respective frames will be explained.

Figure 3:
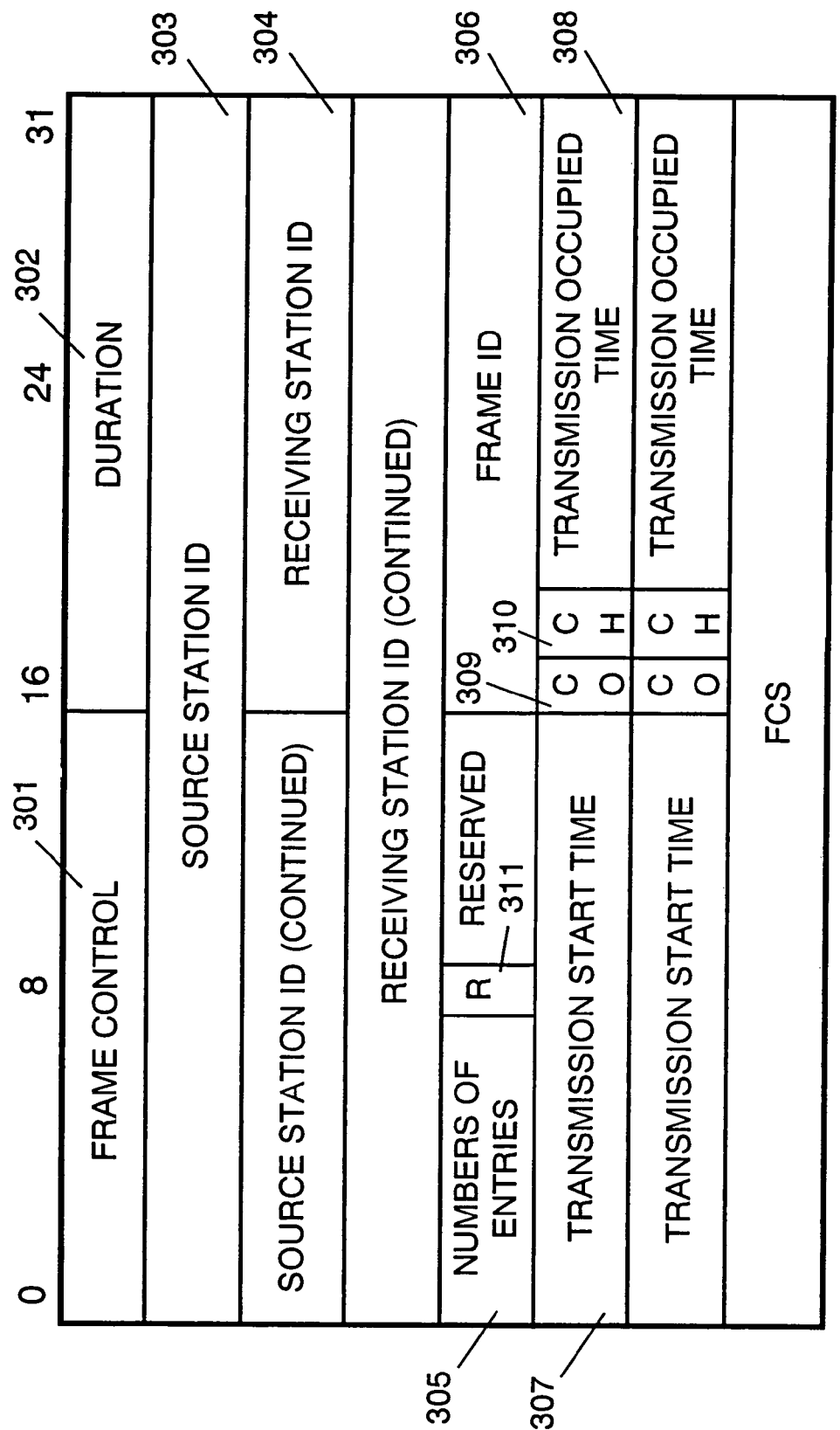
FIG. 3 is a table showing an RTS frame format according to the embodiment 1 of the invention.

FIG. 3 shows a RTS frame format.

In FIG. 3, a frame control 301 is identification information of a frame, and a unique code is set for the RTS frame. A duration 302 indicates the permissible time in which reception of the CTS frame which is a response signal to the RTS frame is accepted. A source station ID 303 identifies a source radio communication device and is set to be the MAC address for that device. A receiving station ID 304 identifies the transmission destination and is set to be the MAC address of the transmission destination radio communication device. The number of entries 305 indicates the number data transmission time slots to be reserved, and a frame ID 306 identifies the RTS frame.

A transmission start time 307 and a transmission occupied time slot 308 indicate the period from the time of CTS reception until the start of transmission of a data frame, and the time devoted exclusively to communication. A collision bit (CO) 309 indicates a collision, but it is not used in the RTS frame. A channel number (CH) 310 designates a channel used for communication of the data frame.

Figure 4:
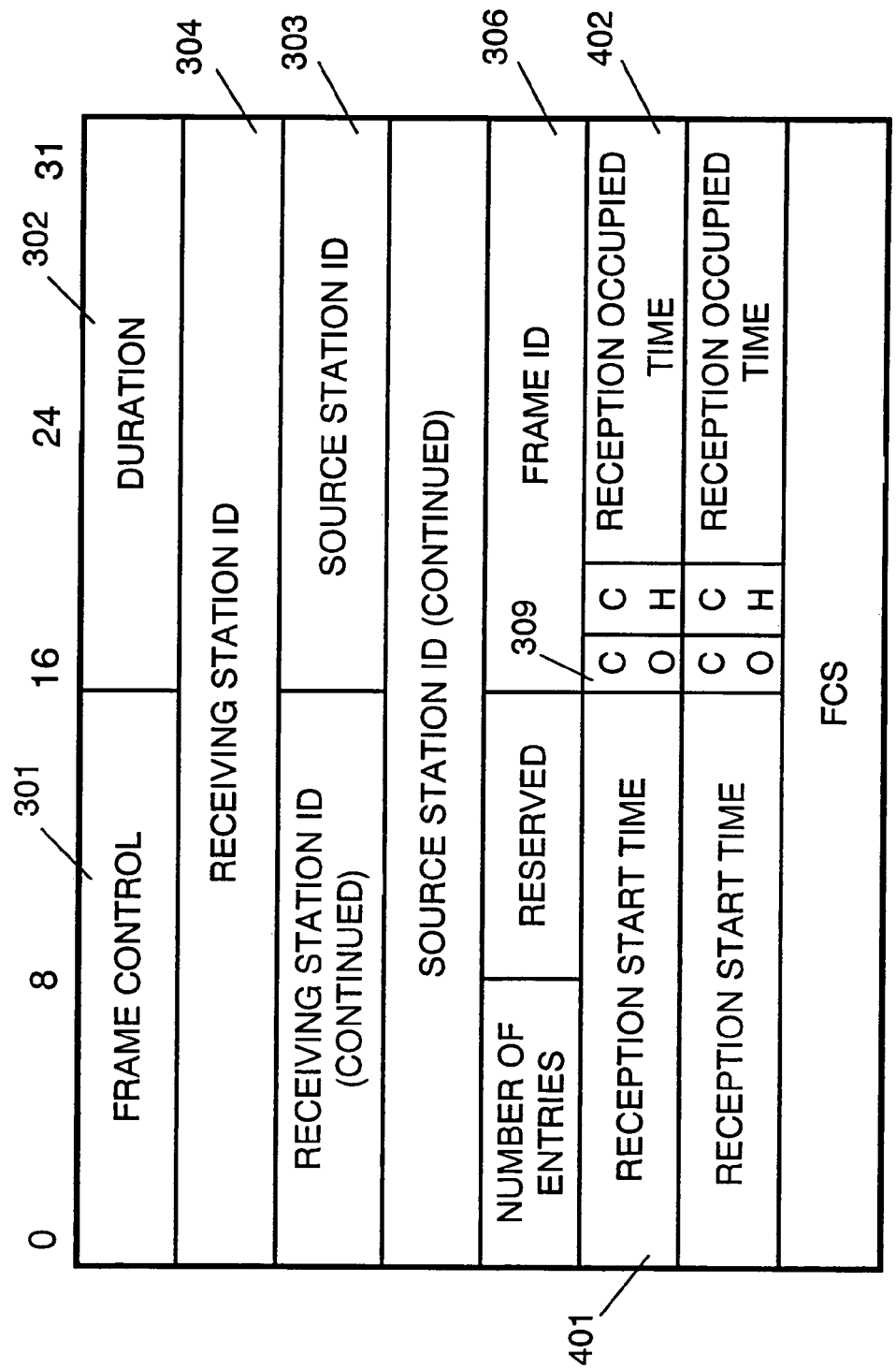
FIG. 4 is a table showing a CTS frame format according to the embodiment 1 of the invention.

FIG. 4 shows a frame format of a CTS frame and an nCTS frame.

A reception start time 401 and a reception occupied time slot 402 of the CTS frame shown in FIG. 4 indicate the time until the start of transmission of the data frame notified by the RTS frame and the time which is occupied to transmission. On the other hand, in the case of the nCTS frame, reception start time 401 and a reception occupied time slot 402 indicate the period from the time of CTS transmission which permits reception designated by the radio communication device receiving signals until the start of reception of the data frame, and the time occupied to reception.

The collision bit (CO) 309 in the CTS frame indicates that there is an overlapping time slot of a time slot of communication prohibition acquired from other radio communication devices and a communication reservation time slot designated by the RTS frame, but the collision bit is not used in the nCTS frame.

The frame ID 306 identifies the RTS frame of the received response target. In the frame control 301, different identifying codes are used in the CTS frame and nCTS frame.

Figure 5:
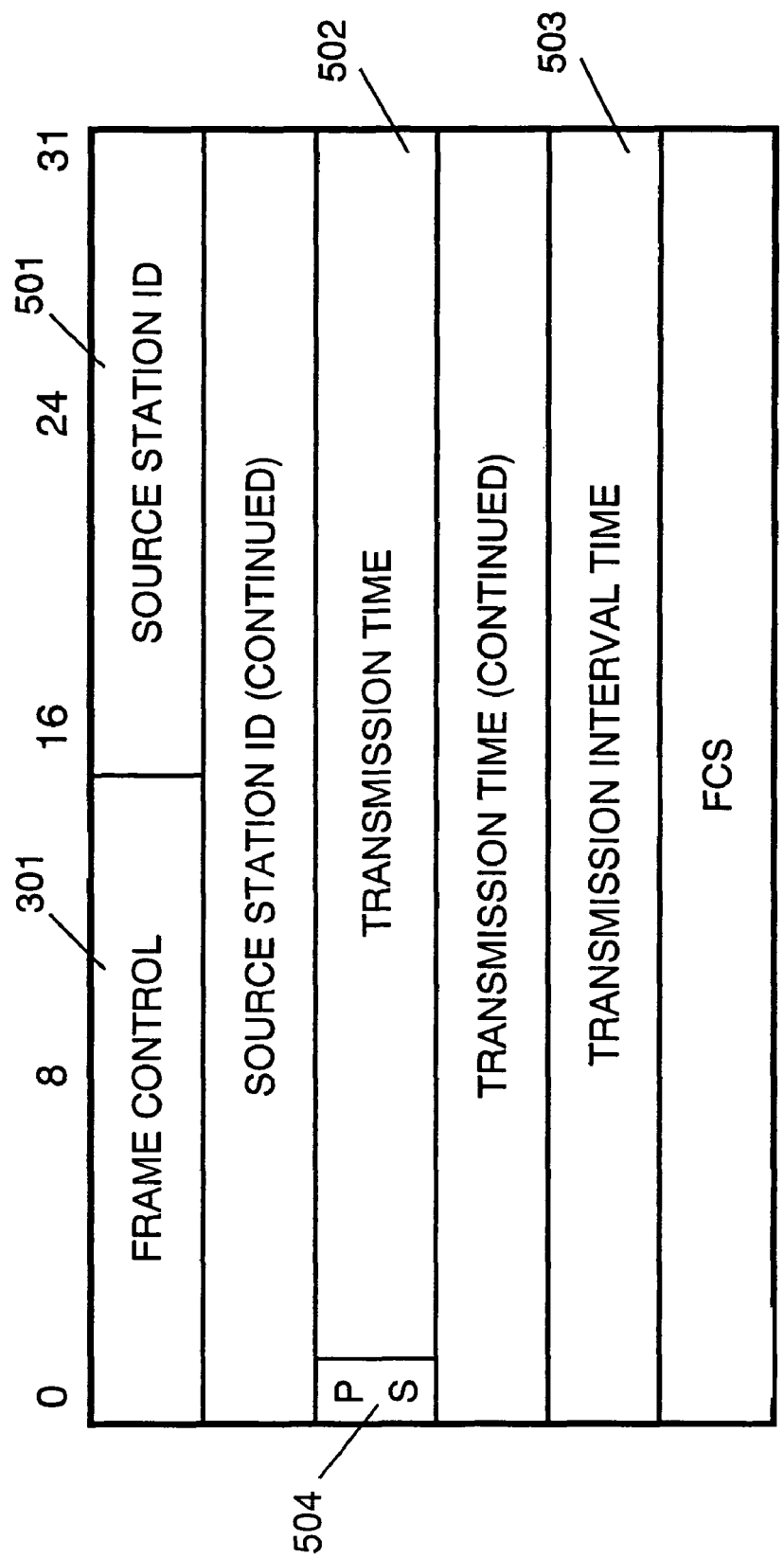
FIG. 5 is a table showing a Keep Alive frame format according to the embodiment 1 of the invention.

FIG. 5 shows a format of a Keep Alive frame.

In FIG. 5, in the frame control 301, a code for identifying the Keep Alive frame is set. A source station ID 501 is an identifier which identifies the source radio communication device and is set as the MAC address. A transmission time 502 indicates the transmission time of the Keep Alive frame, and a transmission interval time 503 indicates a cycle to perform transmission. Further, a PS 504 indicates that the radio communication device is in a power saving mode.

Figure 6:
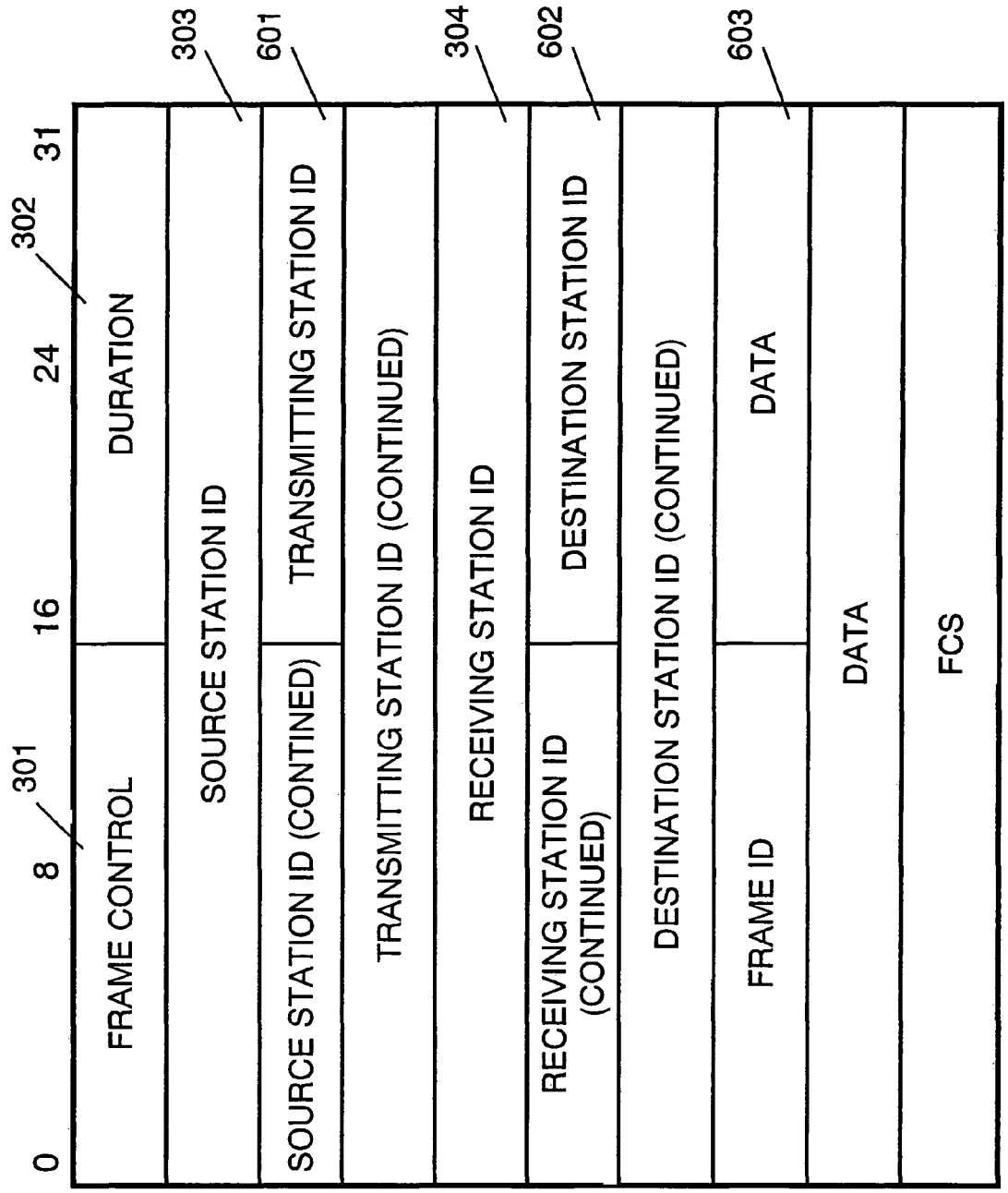
FIG. 6 is a table showing a data frame format according to the embodiment 1 of the invention.

FIG. 6 shows a format of a data frame.

In FIG. 6, the source station ID 303 identifies the radio communication device which is the source of data. Transmitting station ID 601 identifies a radio communication device which relays data. The receiving station ID 304 identifies the radio communication device which is the destination of the data relay, and a destination station ID 602 identifies the radio communication device which is the final destination of data. In the receiving station ID 304 and the destination station ID 602, respective MAC addresses of radio communication devices are set.

The communication data selection unit 202 selects the above types of data frames by referring to the frame control 301.

When the communication data selection unit 202 selects the RTS frame, a communication information analysis unit 204 extracts the source station ID 303, transmission start time 307 and the transmission occupied time slot 308 from the RTS frame and registers them in a communication prohibition table 205. When the communication data selection unit 202 selects the CTS frame, the communication information analysis unit 204 also extracts the source station ID 303, the reception start time 401 and the reception occupied time slot 402 and registers them in the communication prohibition table 205 in the case that the source station ID of the CTS frame is not its own MAC address. A format of the communication prohibition table 205 is shown in FIG. 8.

In FIG. 8, the source station ID 303 is recorded in source ID 801, the transmission start time is added to the time when the RTS frame was received and recorded as the start time of use 803, and the transmission occupied time slot 308 is added to the start time of use 803 and recorded as the transmission occupied time slot 804. Alternatively, the reception start time is added to the time when the CTS frame was received and recorded as the start time of use 803, and the reception occupied time slot is added to the start time of use 803 is recorded as the transmission occupied time slot 804. The frame ID 306 is recorded in a frame ID 805 and the CH310 is recorded in a reception channel ID 806.

The communication information analysis unit 204 sets a flag permitting communication in the communication reservation time slot which has already been registered in a communication reservation table 206 when the source station ID of the CTS frame is the communication information analysis unit MAC address. The communication reservation table 206 is communication reservation information stored by the radio communication device itself when performing transmission to other radio communication devices. A format of the communication reservation information is shown in FIG. 9.

In FIG. 9, the MAC address of the correspondent node is recorded in a destination ID 902, the time until the start of the reserved communication is recorded in a start time of use 903, the reserved communication occupied time slot is recorded in a transmission occupied time slot 904, the frame ID 306 is recorded in a frame ID 905 and a flag indicating the presence of a response is recorded in a response 906.

A communication/response information generation unit 207 generates a CTS frame corresponding to the RTS frame upon receiving notification of the reception of a RTS frame addressed to that communication/response information generation unit from the communication information analysis unit 204. At this time, the communication/response information generation unit 207 checks whether there is a registration of another radio communication device which the wholly or partly is in the time slot of a reserved communication is included in the communication prohibition table 205. The function of generating the CTS frame in the communication/response information generation unit 207 corresponds to the response information generation unit of the invention.

The communication/response information generation unit 207 also generates the RTS frame for reserving communication to other radio communication devices when it receives a communication reservation request from a communication data generation unit 210 which will be described next. The communication/response information generation unit 207 sets the time until starting transmission of data in an event timer 209.

The communication data generation unit 210 generates a transmission data frame from communication message data and the like received from an application unit 203 upon receiving a communication request from the application unit 203. In addition, an instruction to reserve a time slot for transmitting data is made to the communication/response information generation unit 207.

A communication operation to be performed by the radio communication devices 101 to 104 having the above configuration will be explained.

In the initial condition, the communication/response information generation unit 207 generates the Keep Alive frames in a predetermined cycle continuously and transmits them to other radio communication devices in the communicable area from the transmitting unit 211.

At the same time, the communication data selection unit 202, when receiving the Keep Alive frames from other radio communication devices through the receiving unit 201, recognizes radio communication devices existing in the communicable area based on the source station IDs.

Accordingly, the radio communication devices 101 to 104 notify the presence of themselves to one another. Specifically, with the position relation between radio communication devices 101 to 104 in the radio communication network shown in FIG. 1, the radio communication device 101 detects the presence of the radio communication device 102, the radio communication device 102 detects the presence of the radio communication devices 101, 103 and 104. Similarly, the radio communication device 103 detects the radio communication devices 102 and 104, and the radio communication device 104 detects the radio communication device 102 and 103.

Next, the operation of communication reservation, which is performed by a radio communication device for transmitting data to a destination radio communication device in the communicable area, will be explained.

Figure 10:
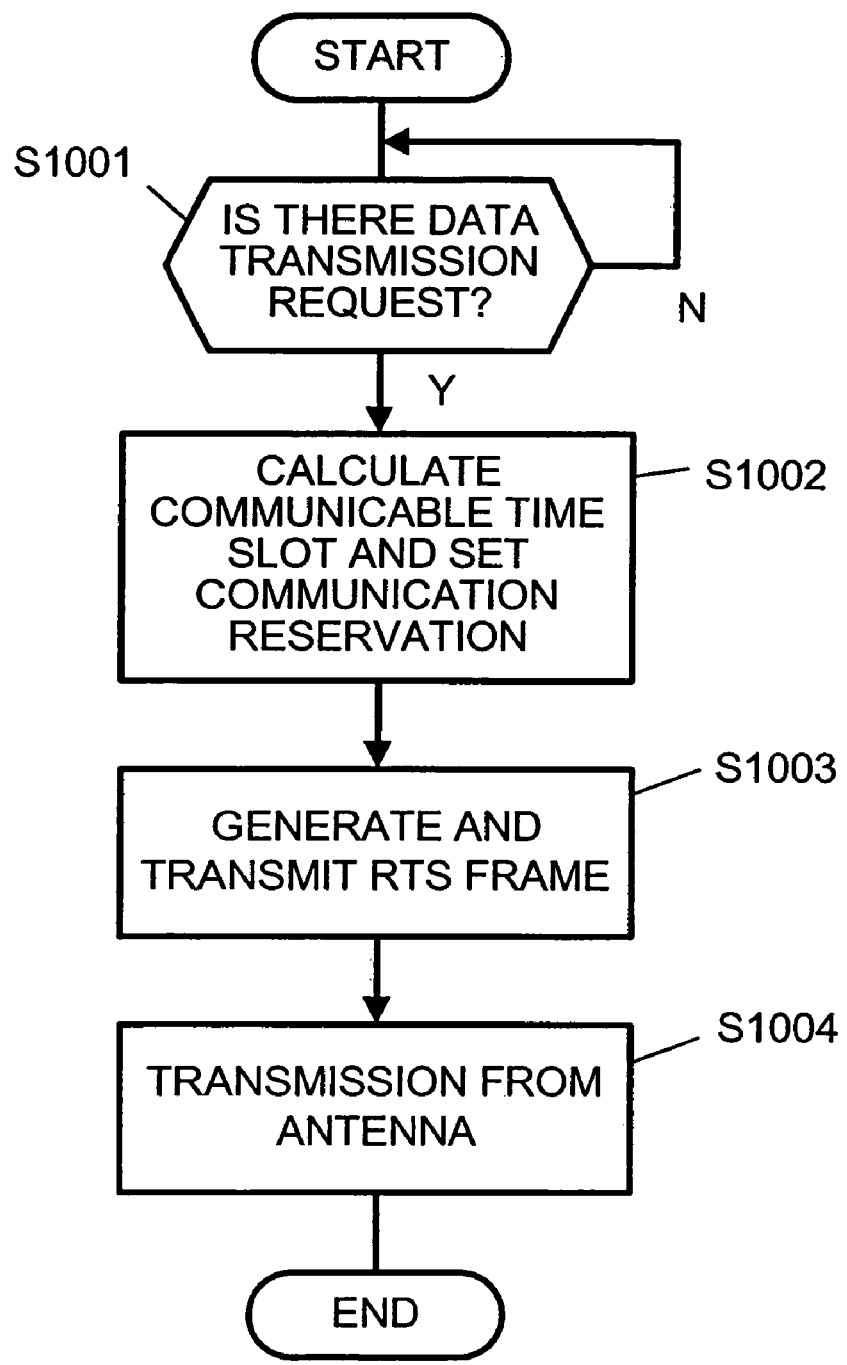
FIG. 10 is a flow chart showing operations of transmitting an RTS frame by the radio communication device according to the embodiment 1 of the invention.

FIG. 10 is a flow chart showing an operation of transmitting the RTS frame for the communication reservation.

First, when the communication data generation unit 210 receives a transmission request of communication message data addressed to another radio communication device from the application unit 203 (step S1001), it instructs the communication/response information generation unit 207 to reserve communication.

Next, the communication/response information generation unit 207 refers to the communication prohibition table 205 and finds a time slot in which communication is not prohibited. Then, the time slot in which communication is possible is registered in the communication reservation table (step S1002). In the initial condition of the communication prohibition table 205, prohibition time slots are not recorded, but when the radio communication device receives the communication reservation not addressed to itself, the communication information analysis unit 204 records the communication prohibition time slot.

Next, communication/response information generation unit 207 sets the transmission start time and the transmission occupied time slot in the transmission start time 307 and the transmission occupied time slot 308 fields of the RTS frame, respectively, to reserve the time slot when transmission is possible. Its MAC address is also set to be the source station ID 303 and the destination MAC address is set to be the receiving station ID 304, respectively, to generate the RTS frame (step S1003). After that, the communication/response information generation unit 207 transmits the RTS frame to the transmitting unit 211, which in turn transmits the RTS frame through the antenna 200 (step S1004).

The above is the operation of data transmission reservation by the radio communication device.

Figure 11:
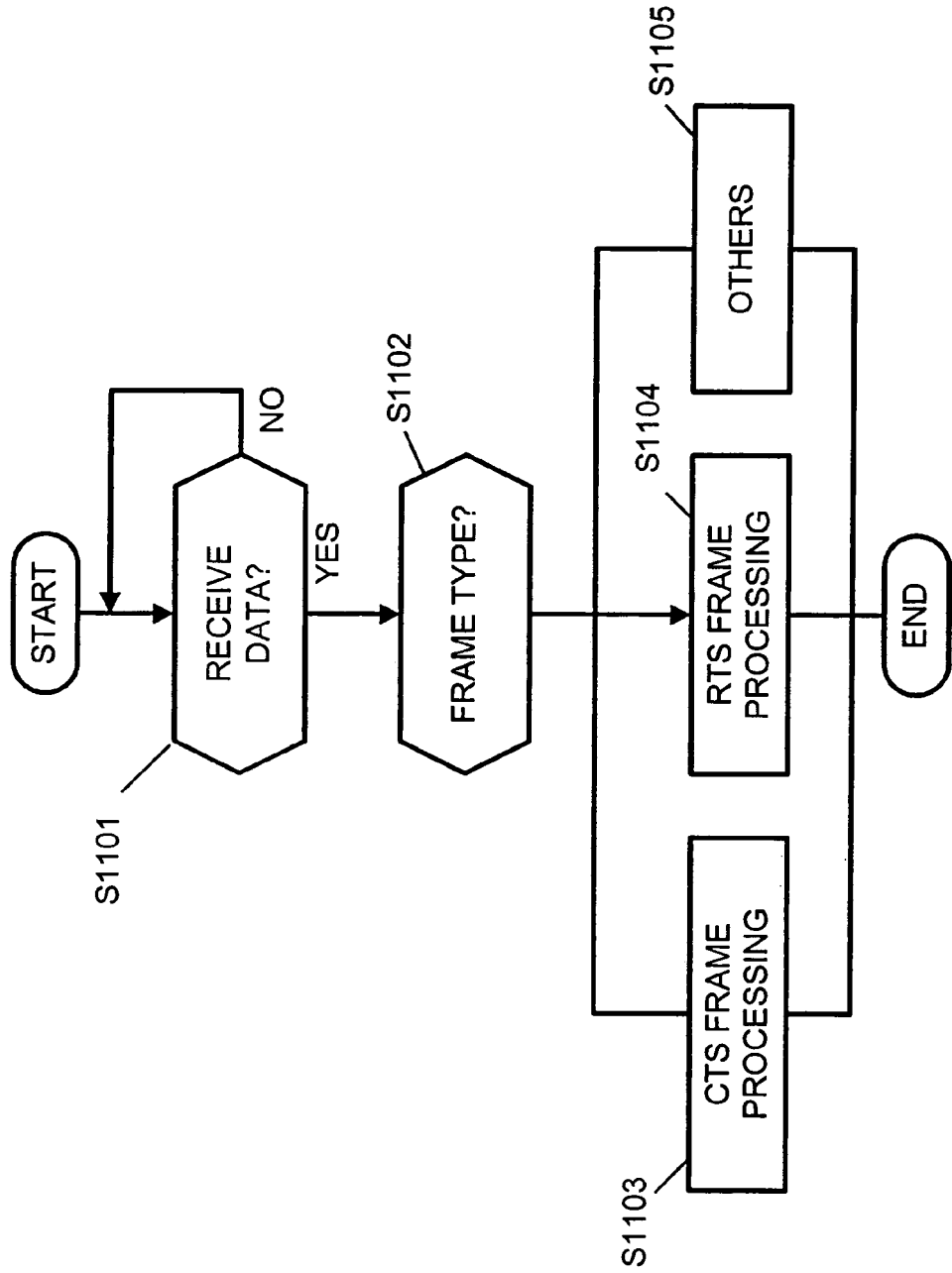
FIG. 11 is a flow chart showing reception operations performed by the radio communication device according to the embodiment 1 of the invention.

Next, a reception operation and a data transmission operation performed by the radio communication device will be explained with reference to FIG. 11 to FIG. 13.

First, a signal received from the antenna 200 is converted to a digital frame in the receiving unit 201 (step S1101). The communication data selection unit 202 identifies the type of the digital frame generated in the receiving unit 201 (step S1102).

After that, depending on the frame type, CTS frame processing (S1103), an RTS frame processing (S1104), or other processing (processing in the case of reception of a Keep Alive frame, a data frame and the like: step S1105) is performed.

Each type of frame processing will now be explained in detail.

Figure 12:
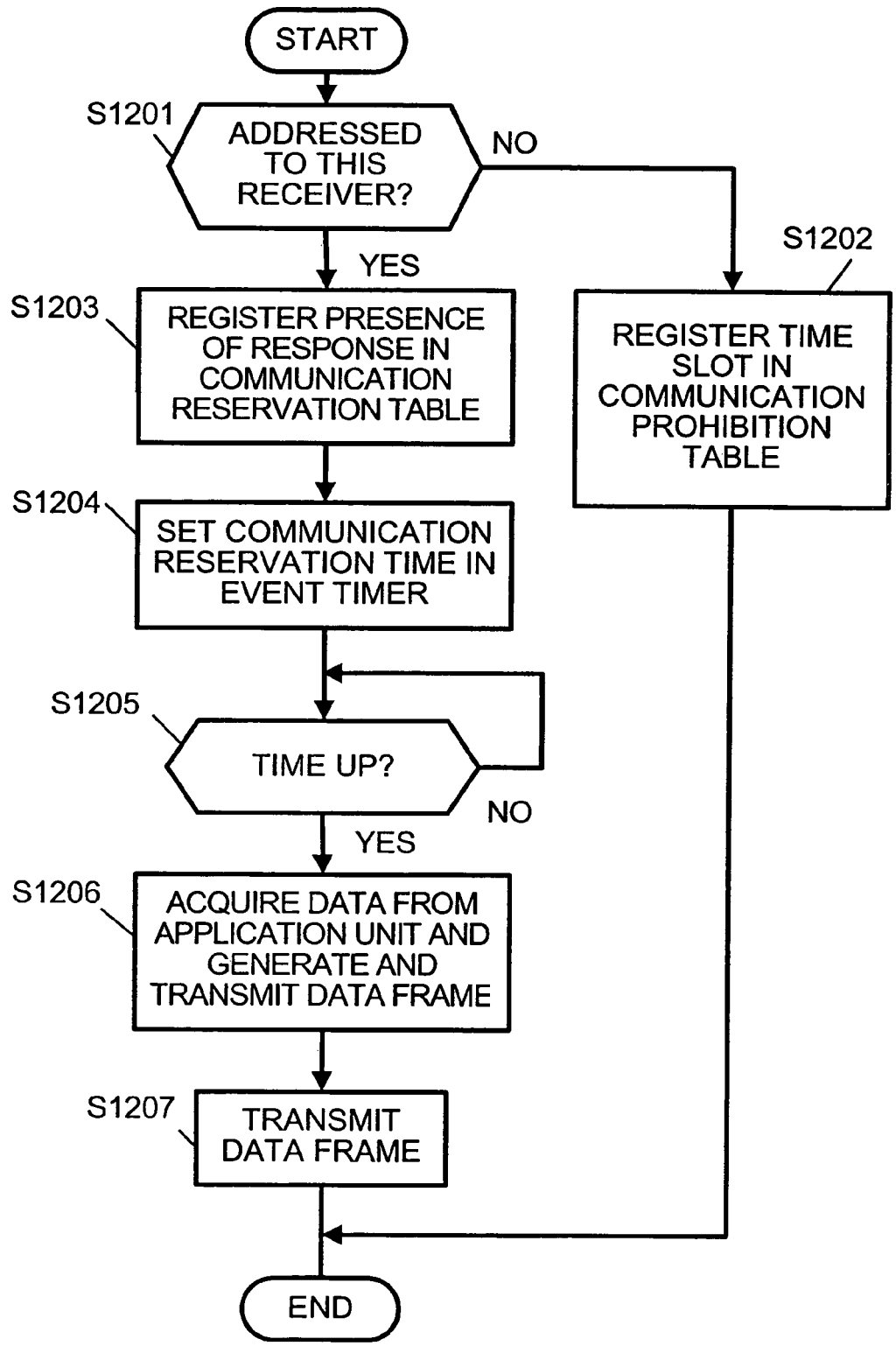
FIG. 12 is a flow chart showing CTS frame processing performed by the radio communication device according to the embodiment 1 of the invention.
Figure 13:
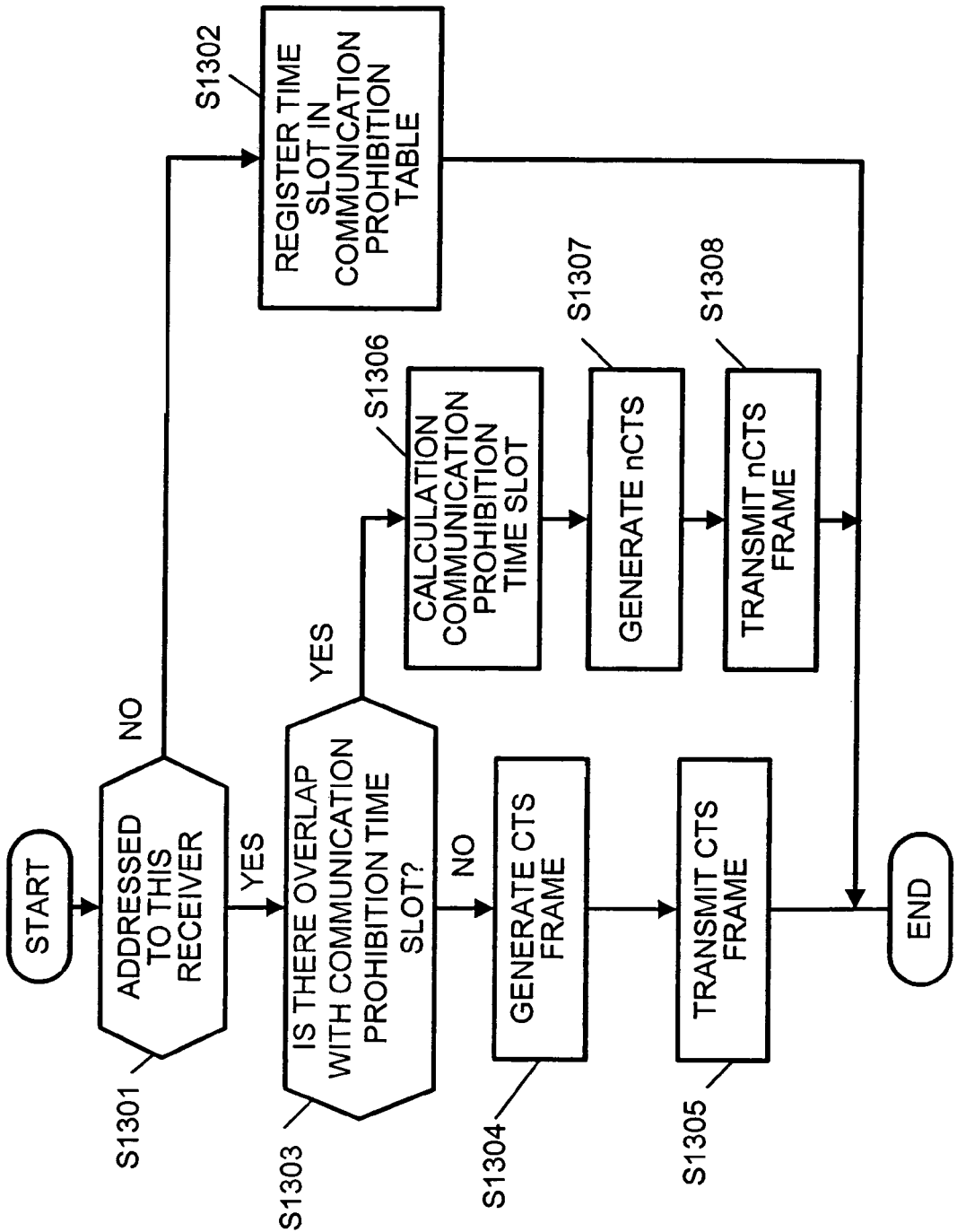
FIG. 13 is a flow chart showing RTS frame processing performed by the radio communication device according to the embodiment 1 of the invention.

FIG. 12 is a flow chart showing the CTS frame processing (step S1103).

First, the communication information analysis unit 204 judges whether the MAC address source station ID of the received CTS frame matches its own address (step S1201). When the MAC address is not its own, the start time of use 803 and the transmission occupied time slot 804 calculated from the transmission start time 307 and the transmission occupied time slot 308 are registered in the communication prohibition table 205, linking them with the source station ID 303 (source ID 801) (step S1202).

On the other hand, if the MAC address is its own, a flag indicating the presence of response is set in the communication reservation table 206 in the response field 906 (step S1203).

Next, the communication/response information generation unit 207 sets in the event timer 209 the start time of use 903 which has been registered in the destination ID 902 corresponding to the receiving station ID 304 in the communication reservation table 206, and starts operation (step S1204).

Next, the event timer 209 makes a notification to the communication data generation unit 210 when the event time expires (step S1205). On receipt of the notification, the communication data generation unit 210 receives from the application unit the communication message data and the like to be transmitted 203 and generates a data frame (step S1206). After that, the communication data generation unit 210 transmits the generated data frame to the transmitting unit 211, which in turn transmits the data frame through the antenna 200 (step S1207).

Next, the RTS frame processing (step S1104) will be explained with reference to a flow chart in FIG. 13.

The communication information analysis unit 204 judges whether MAC address of the source station ID 303 in the RTS frame matches its own address (step S1301). When the MAC address is not its own, the start time of use 803 and the transmission occupied time slot 804 calculated from the transmission start time 307 and the transmission occupied time slot 308 are registered in the communication prohibition table 205, linking them with the source station ID 303 (source ID 801) (step S1302).

On the other hand, when the MAC address is its own, it is checked whether there is a time slot registered in the communication prohibition table 205 even partly overlapping with the received time slot of communication reservation (step S1303).

When there is not an overlapping time slot, the communication/response information generation unit 207 judges that the reception is possible without interference by other radio communication devices and generates the CTS frame (step S1304). After that, the communication/response information generation unit 207 transmits the generated CTS frame to the transmitting unit 211, which in turn transmits the CTS frame through the antenna 200 (step S1305).

In the step S1303, when there is an overlapping time slot, a prohibition time slot is calculated adding the time slot of communication prohibition registered in the communication prohibition table 205 (step S1306).

Next, the communication/response information generation unit 207 sets the calculated time slot of communication prohibition in the reception start time 401 and the reception occupied time slot 402 of the nCTS frame. In addition, the same frame ID as the RTS frame is set in the frame ID 306 (step S1307). In the case that there are plural calculated time slots, their reception start times 401 and their reception occupied time slots 402 are set and the same number of entries are set as the number of these pairs. After that, the communication/response information generation unit 207 transmits the generated nCTS frame to the transmitting unit 211, which in turn transmits the nCTS frame through the antenna 200 (step S1308).

Other reception processing operations (step S1105) are normal reception processing operations, namely, data and the like are passed from the communication data selection unit 202 to the application unit 203.

Next, operations in which the radio communication devices perform communication with one another in the radio communication network shown in FIG. 1 will be explained as follows with reference to FIG. 7. A case when the radio communication device 101 transmits data to the radio communication device 102 is cited as an example.

First, the radio communication device 103 transmits an RTS signal 701 in the communicable area 113 from the non-directional antenna to make communication with the radio communication device 104 in the communicable area 113. The radio communication device 102 is in the area 113, so it receives the RTS signal 701 from the radio communication device 103. At this time, the radio communication device 102 registers the RTS signal 701 in the communication prohibition table as a time slot of communication prohibition. FIG. 8 shows registration data at this time, in which the source station ID MAC address of the received RTS signal 701 is recorded in the source ID 801, the RTS signal 701 received by the destination station ID 304 is recorded in a destination ID 802, the transmission start time 307 of the received RTS signal 701 is recorded in the start time of use 803, the transmission occupied time slot 308 of the RTS signal 701 is recorded in the transmission occupied time slot 804, the frame ID 306 of the received RTS signal 701 is recorded in the frame ID, and the channel number (CH) 310 of the received RTS signal 701 is recorded in the reception channel ID.

Next, a CTS signal 702 is sent from the radio communication device 104 toward the radio communication device 103 in the area 114. The radio communication device 102 is also located in the area 114, so it also receives the CTS signal 702. At this time, the radio communication device 102 tries to register the signal in the communication prohibition table 205 as a time slot of communication prohibition, but it was registered when it received the RTS signal 701, so the registration is not performed again.

Next, the radio communication device 101 transmits a RTS signal 703 to start communication with the radio communication device 102 in the communicable area 111.

Next, when the radio communication device 102 receives the RTS signal 703 from the radio communication device 101, radio communication device 102 recognizes from the source station ID 303 and the receiving station ID 304 of the RTS frame that the radio communication device 101 requests communication with radio communication device 102. The radio communication device 102 detects the time slot of data transmission from the transmission start time 307 and the transmission occupied time slot 308. The radio communication device 102 refers to the communication prohibition table 205 and detects that the detected time slot overlaps in part with the time slot of communication between the radio communication device 103 and the radio communication device 104 in the same channel, which has been previously recorded. The radio communication device 102 notifies the radio communication device 101 by an nCTS signal 704 that the reception in the designated time slot can not be performed because of the detection of the overlapping communication time slot, giving the time slot of communication prohibition. However, when the channel of the communication prohibition table 205 is a different channel, the radio communication device 102 sends a CTS signal in response to the RTS signal in the usual manner.

Next, the radio communication device 101, when receiving the nCTS signal 704, calculates a time slot meeting the conditions for transmission, removing the time slot of communication prohibition which has been notified by the radio communication device 102, and again reserves communication for the calculated time slot in a RTS signal 705.

Next, the radio communication device 102, when receiving the RTS signal 705, confirms that the calculated time slot does not overlap with a time slot of communication prohibition which is registered in the communication prohibition table 205 and transmits a CTS signal 706 to the radio communication device 101. Further, the calculated time slot is registered in the communication reservation table 206, thus refusing transmissions from other radio communication devices to the radio communication device 102. FIG. 9 shows registration data at this time, the source station ID 303 of the RTS signal 705 is recorded in a source ID 901, the receiving station ID 304 of the RTS signal 705 is recorded in the destination ID 902, the transmission start time 307 of the RTS signal 705 is recorded in the start time of use 903, the transmission occupied time slot 308 of the RTS signal 705 is recorded in the transmission occupied time slot 904, the frame ID 306 of the RTS signal 705 is recorded in the frame ID 905 and "0(zero)" is recorded in the response 906.

Next, when the radio communication device 101 receives the CTS signal 706 and judges that communication is possible, it sets the transmission start time "t1" in the event timer 209 and starts operation. At this time, the CTS signal 706 is also transmitted to the radio communication device 103 and the radio communication device 104 which are located in the communicable area 112 of the radio communication device 102. The radio communication device 103 and the radio communication device 104 record the notified time slot as the time slot of communication prohibition in the same way as the radio communication device 102.

After that, data transmissions 707 to 708 are performed from the radio communication device 103 to the radio communication device 104. At this time, the radio communication device 102 receives these data transmissions but ignores them as they are not addressed to radio communication device 102.

Next, the radio communication device 101 performs data transmissions 709 to 710 after the set transmission start time "t1" has passed, and these are received by the radio communication device 102. If the radio communication device 101 has further data to be transmitted, or if it wants to transmit data to the radio communication device 102 simultaneously, it gives notice by a signal 711 of the continuation of data and the time "t2" which is the time when the next RTS signal is transmitted. The frame used at this time is same as the RTS frame.

Next, when the radio communication device 102 acquires the time "t2" when an RTS signal 712 is transmitted, it registers this time in the communication reservation table so as to refuse reception of transmission from other radio communication devices.

Next, the radio communication device 101 transmits the RTS signal 712 to the radio communication device 102 at the designated time "t2" to reserve communication. At this time, a new transmission start time "t3" is notified.

Subsequent operations are same as the operations after receiving the RTS signal 705. The radio communication device 102, when receiving the RTS signal 712, confirms that the time slot does not overlap with a time of communication prohibition which is registered in the communication prohibition table 205, and transmits a CTS signal 713 to the radio communication device 101. After the time "t3" has passed, the radio communication device 101 performs data transmissions 714 to 715 and the radio communication device 102 receives them.

In the present embodiment, the time slot of communication prohibition is notified from the radio communication device which is the transmission destination to the source radio communication device, but it is not limited to this, and it is possible that a time slot in which communication can be permitted is notified. According to this, only a time slot which is suitable for the reception-side radio communication device can be notified, and as a result, it becomes possible to shorten the CTS frame length as compared with the case in which plural time slots of communication prohibition are notified.

Also in the embodiment, the radio communication device 102 notifies that reception is not permitted and gives the time slot of communication prohibition using the nCTS frame 704 when the communication reservation from the radio communication device 101 overlaps with the time slot of communication prohibition, but it is possible to give notice only that reception is not permitted, setting the collision bit (CO) 309 of the CTS frame. In this case, the source radio communication device receives the notification that reception is not permitted and, if necessary, inquires of the transmission-destination radio communication device about the time slot of communication prohibition. Then, it is also possible that the transmission-destination radio communication device responds to the inquiry and notifies the time slot of communication prohibition. According to this, the source radio communication device does not inquire as to the time slot of communication prohibition if not necessary, and therefore, the source and transmission-destination radio communication devices do not have to perform unnecessary data transmission.

As described above, the radio communication device according to the invention can receive the RTS signals sent from other radio communication devices in the communicable area, and therefore, the device can know the time slots used by other radio communication devices which perform communication with other radio communication devices. Therefore, the communication addressed to the device in question can be performed while avoiding the time slots in which other radio communication devices perform data transmission, and as a result, the radio communication device can receive data addressed to itself without interference.

The radio communication device according to the invention can also always send or receive the RTS signal, and therefore, the possibility of reception failure caused by the collision of the RTS signal is low. Accordingly, it is easy to realize the above operation.

According to the invention, after one data transmission, the radio communication device gives notice of the communication time of the next RTS signal to be transmitted, and therefore, the RTS signal can be received more reliably. By fixing the transmission start time from the RTS signal, synchronized communication of data with respect to the transmission destination becomes possible.

Furthermore, the radio communication device according to the invention can always receive the RTS signal, and therefore, the radio communication devices in the communicable area can receive broadcasts transmitted from other radio communication devices.

The radio communication device according to the invention can also perform communication using plural channels simultaneously, and therefore, larger capacity communication becomes possible.

Second Embodiment

Figure 14:
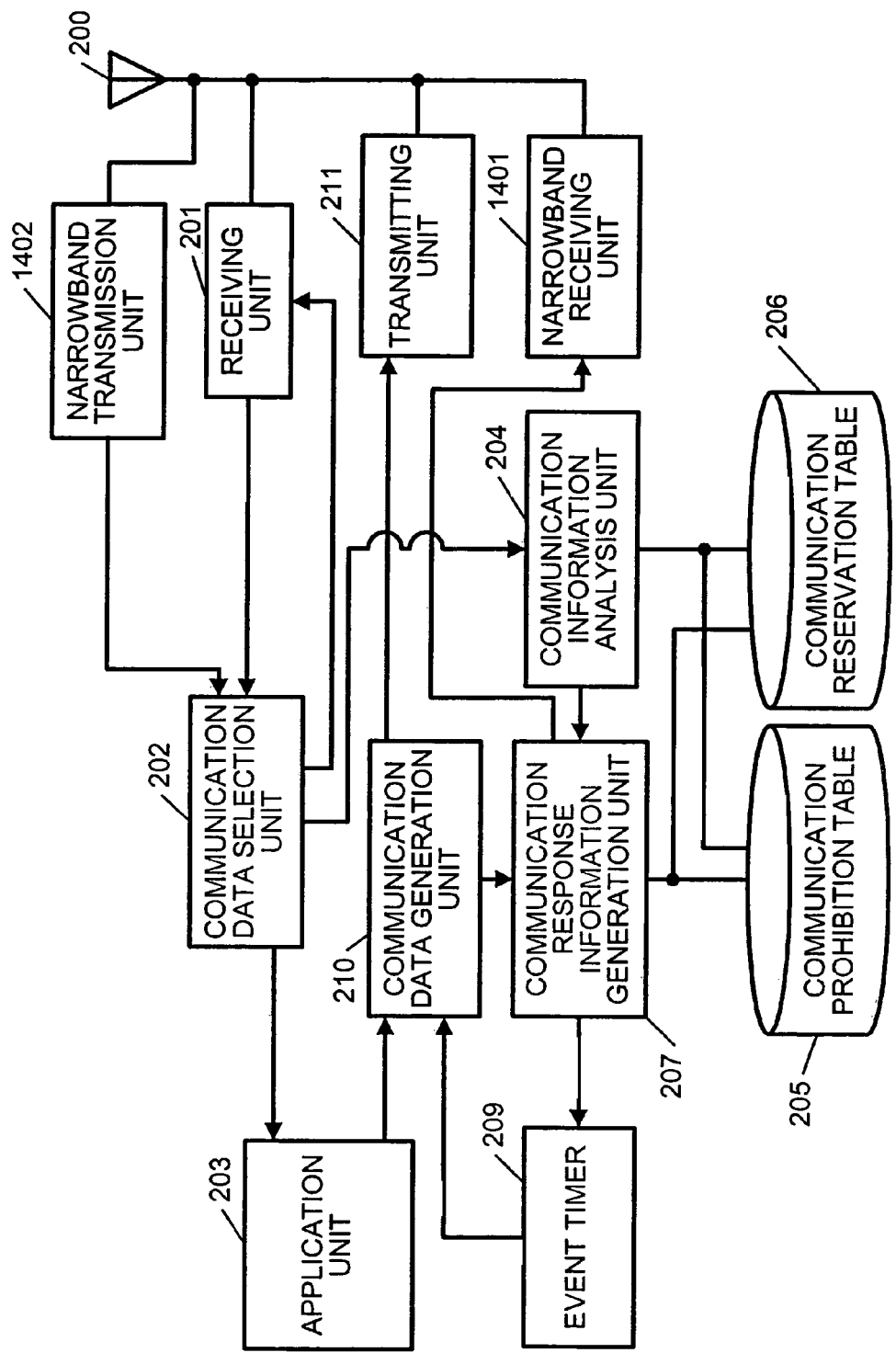
FIG. 14 is a diagram showing a configuration of a radio communication device according to an embodiment 2 of the invention.

FIG. 14 is a block diagram showing a configuration of a radio communication device according to the embodiment. It differs from the configuration of the radio communication device written in the embodiment 1 in that it has a narrowband receiving unit 1402 and a narrowband transmitting unit 1401 which can transmit and receive only in a narrow-band channel, in addition to the receiving unit 201 and the transmitting unit 211.

In the embodiment, RTS/CTS are used for unicast transmission to a power-saving node.

In FIG. 14, the narrowband transmitting unit 1401 transmits an RTS signal or a multicast signal whose transmission channel is limited to a narrowband channel no wider than a predetermined width. The transmitting unit 211 is used for data transmission and the like, and the communication/response information generation unit 207 transmits the RTS signal or the multicast signal to the narrowband transmitting unit 1401.

The narrowband receiving unit 1402 receives the RTS signal and the multicast signal in a reception channel which is limited no wider than the predetermined width. Therefore, the narrowband receiving unit 1402 can be a circuitry which operates at lower speed than the receiving unit 201, and as a result, power consumption becomes lower than the receiving unit 201. The communication data selection unit 202 selects frames from the receiving unit 201 and the narrowband receiving unit 1402, and instructs the receiving unit 201 to use the power save mode when data reception is completed and shift is made to a reception mode for the RTS signal. The communication data selection unit 202 also instructs the receiving unit 201 to return to the normal mode from the power saving mode after receiving the RTS signal from the narrowband receiving unit 1402.

When the communication information analysis unit 204 receives the notification for the power saving from the communication data selection unit 202, communication information analysis unit 204 makes a notification to the communication/response information generation unit 207. The communication/response information generation unit 207 transmits a Keep Alive frame from the narrowband transmitting unit 1401, setting information indicating the power saving mode in the PS flag 504 of the Keep Alive frame. In this way, the radio communication device notifies neighboring radio communication devices that it is in the power saving mode. The receiving unit 201 stops a receiving function and is in the power saving mode until it receives the instruction for return to normal mode from the communication data selection unit 202.

Components other than the above are same as the embodiment 1.

The communication operations are also same as the embodiment 1 except that the RTS signal is transmitted from the narrowband transmitting unit 1401 and that the RTS signal is received in the narrowband receiving unit 1402.

Thus, the narrowband radio communication is performed by the RTS signal and the multicast signal, and therefore, when the data transmission and reception are completed, a UWB radio communication device can allow the receiving unit 201 to be in the power saving mode until the RTS signal is received. Accordingly, even when the UWB radio communication device which requires much power for carrier sense of UWB is always in the state for reception of an RTS signal, power consumption can be suppressed.

In the embodiment, when the communication data selection unit 202 receives the RTS signal from the narrowband receiving unit 1402, communication data selection unit 202 instructs the receiving unit 102 to return to normal mode from the power saving mode, but it is not limited to this, and it is possible that the communication data selection unit 202 is notified of the time slot in which the transmission of data addressed to itself is reserved by the communication information analysis unit 204 and instructs the receiving unit 201 to return from the to normal mode from power saving mode at only the time slot in which the transmission is reserved. Accordingly, power consumption can be further reduced. The radio communication device can also shift the receiving unit 201 to the power saving mode by an instruction originating from the application unit 203, or a user can put the receiving unit 201 in the power saving mode as desired.

The radio communication device also can request in advance other radio communication devices located in neighboring communicable areas to transmit RTS signals or multicast signals in the narrowband channel. The Keep Alive frame shown in FIG. 19 is used for this transmission request.

Figure 19:
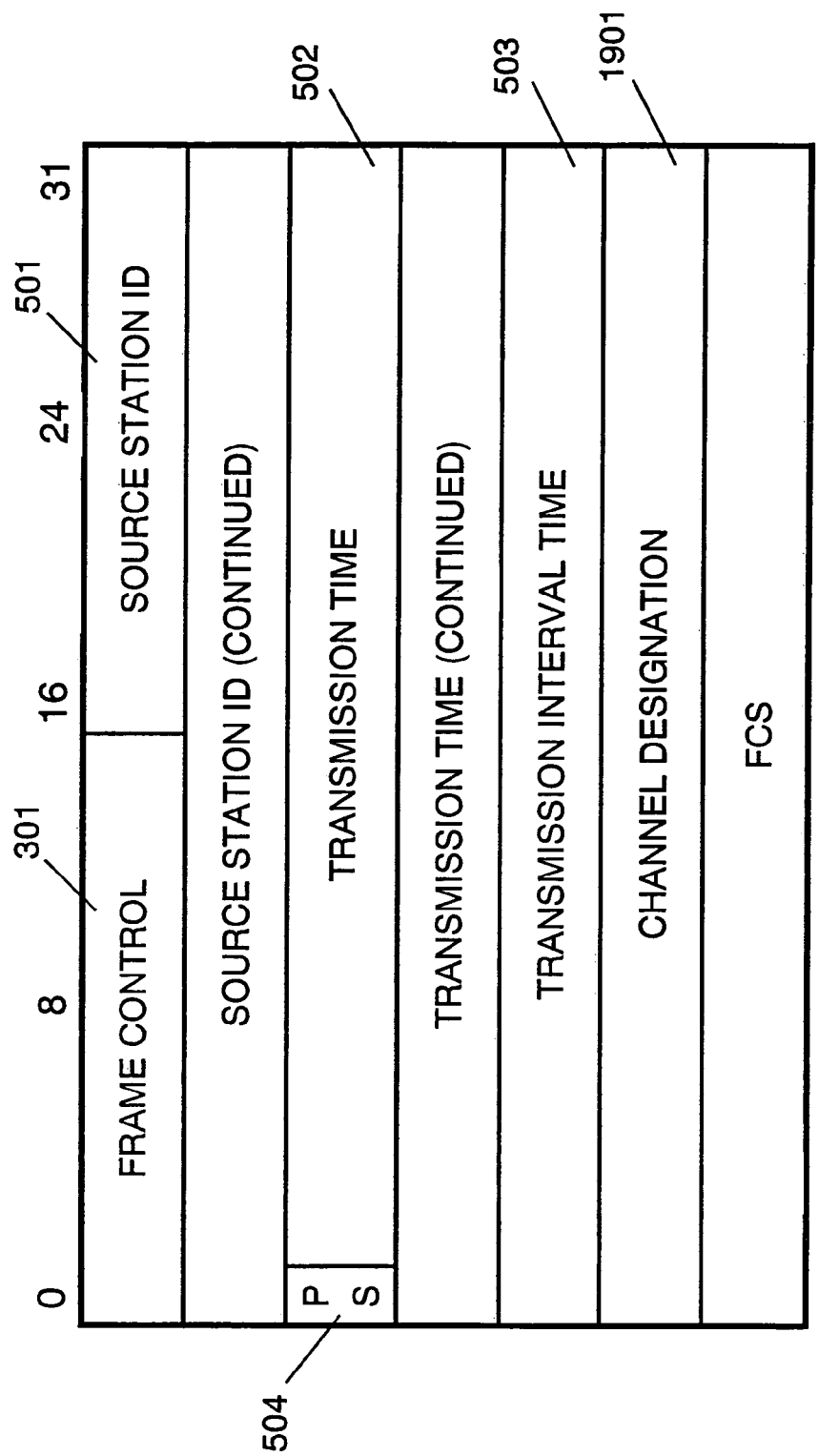
FIG. 19 is a table showing a Keep Alive frame format according to the embodiment 2 of the invention.

In FIG. 19, the configuration differs from the configuration of the Keep Alive frame shown in FIG. 5 in that a channel designation field 1901 is included. The channel used for transmission of the RTS signal and the multicast signal is requested by the channel designation field 1901.

Accordingly, other radio communication devices can transmit RTS signals or multicast signals in the narrow band channel according to the request.

In the embodiment, the explanation was made using carrier signals, but it is not limited to this. It is possible that a signal notifying the carrier is made to be a preamble of the frame.

According to this, a radio communication method of the invention can be applied to any protocol regardless of the communication format.

Embodiment 3

Figure 20A:
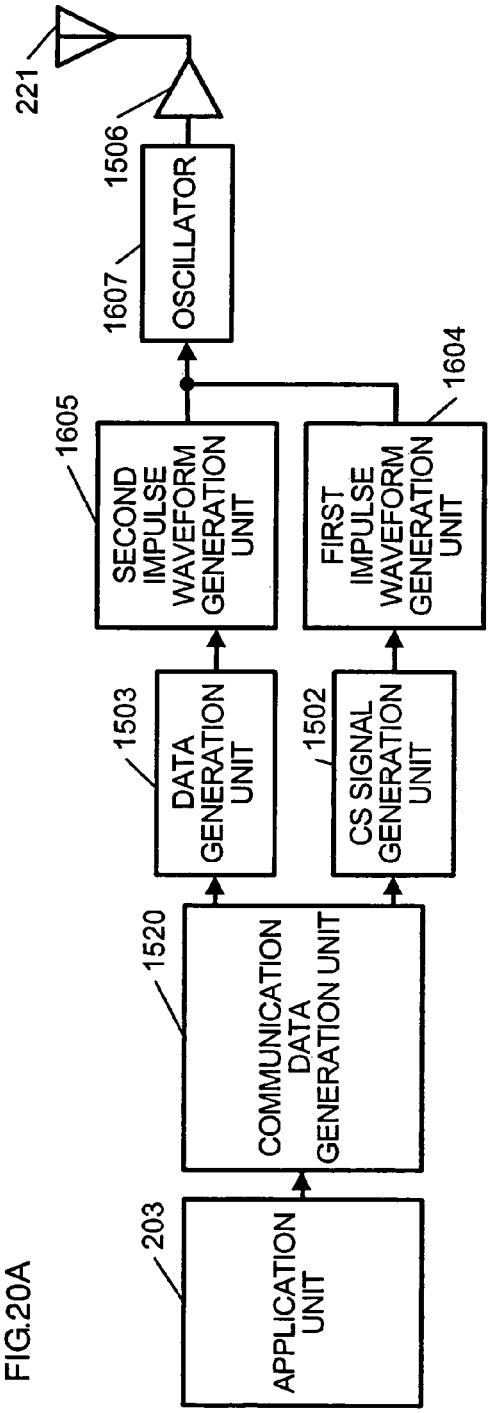
FIG. 20A is a diagram showing a configuration of a transmitter according to the embodiment 3 of the invention.
Figure 20B:
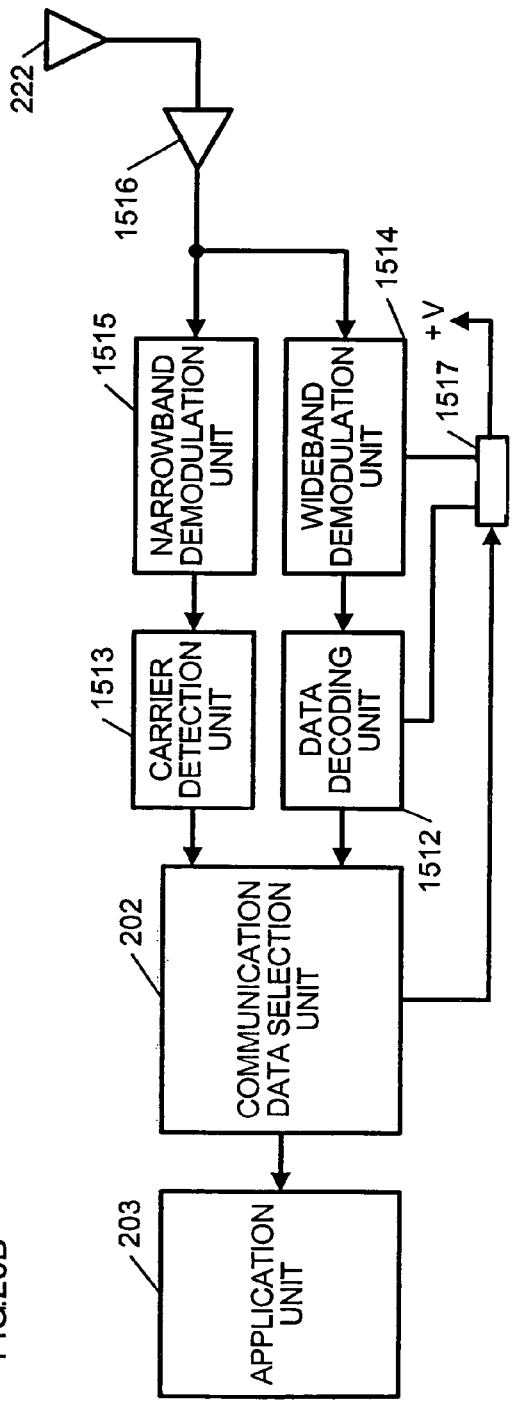
FIG. 20B is a diagram showing a configuration of a transmitter according to the embodiment 3 of the invention.
Figure 21:
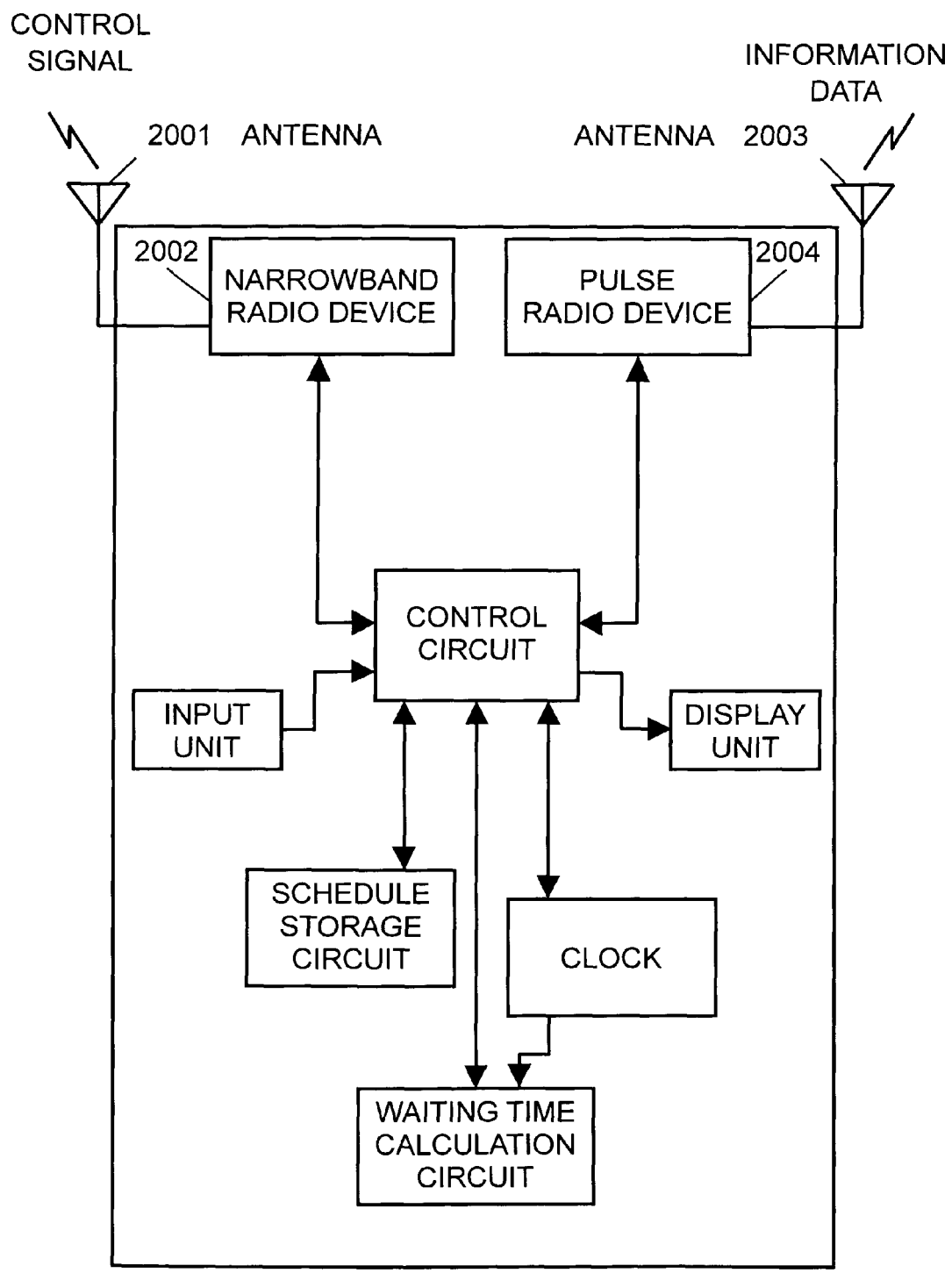
FIG. 21 is a block diagram showing a configuration of a radio communication device in a conventional example.
Figure 22:
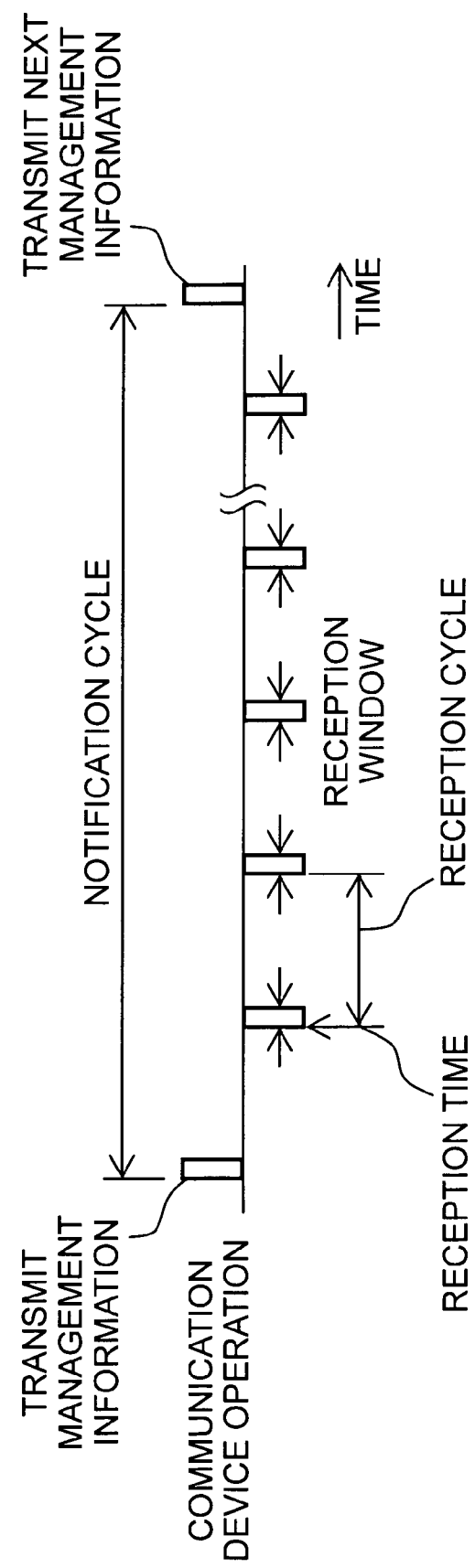
FIG. 22 is a diagram showing a radio communication method in the conventional example.

FIGS. 20A and 20B are a transmitter and a receiver according to an embodiment 3 of the invention.

First, a configuration of the transmitter according to the embodiment will be explained.

In FIG. 20A, a communication data generation unit 1520 generates communication data such as communication messages upon receiving an instruction from the application unit 203.

A CS signal generation unit 1502 generates a carrier sense signal (CS signal) including control information which controls a procedure for transmitting data or switching communication channels, and a data generation unit 1503 generates a data frame.

A first impulse waveform generation unit 1604 supplies an impulse waveform modulated by the CS signal having an impulse width of "τ1" to an oscillator 1607. The CS signal generation unit 1502 and the first impulse waveform generation unit 1604 comprise a control information pulse generation unit.

A second impulse waveform generation unit 1605 supplies the impulse waveform modulated by a data signal having an impulse width of "τ2" to the oscillator 1607. The data generation unit 1503 and the second impulse waveform generation unit 1605 comprise a data pulse generation unit according to the invention.

The pulse width "τ1" is set to be wider than the pulse width "τ2".

The oscillator 1607 outputs an oscillation signal according to the inputted impulse waveform. The oscillation signal is an UWB signal prescribed by the impulse width of the inputted impulse signal.

An amplifier 1506 supplies a radio signal which is amplified to an amplitude required for transmission, to an antenna 221 to be radiated into space. The amplifier 1506 and the antenna 221 comprise the transmitting unit according to the invention.

Next, a configuration of the receiver according to the embodiment will be explained.

In FIG. 20B, an amplifier 1516 amplifies a signal so that the signal supplied from an antenna 222 has the amplitude required for reception processing.

A narrowband demodulation unit 1515 demodulates the reception signal when the reception signal is a signal of narrowband modulation. By setting the modulation rate to be less than or equal to a predetermined value, the demodulation rate of the narrowband demodulation unit 1515 which demodulates the modulated signal can be set to be less than or equal to the prescribed value. Accordingly, the operation rate of elements included in the narrowband demodulation unit 1515 can be set low. Therefore, power consumption of the narrowband demodulation unit 1515 can be made less than or equal to a predetermined value. The narrowband demodulation unit 1515 and a carrier detection unit 1513 comprise a first receiving unit of the invention.

A wideband demodulation unit 1514 demodulates the reception signal when the reception signal is a signal of wideband modulation. The wideband demodulation unit 1514 and a data decoding unit 1512 comprise a second receiving unit of the invention.

An power supply switch 1517 is a switch for controlling power supply to the data decoding unit 1512 and the wideband demodulation unit 1514, and the data decoding unit 1512 and the wideband demodulation unit 1514 are put into a power saving mode by stopping power supply. In their initial state, they are in the power saving mode.

An operation when the transmitter and the receiver configured as above communicate with each other will next be explained.

First, the communication data generation unit 1520 of the transmitter generates communication data upon instruction from the application unit and instructs the CS signal generation unit 1502 to transmit the CS signal.

The CS signal generation unit 1502, after generating the CS signal including an ID for identifying the transmission destination receiver, outputs the signal to the first impulse waveform generation unit 1604.

The first impulse waveform generation unit 1604 slices the CS signal into an impulse with width of "τ1" which is the pulse width of the oscillator 1607. According to this, a narrowband signal is generated.

After the narrowband signal is amplified in the amplifier 1506, it is radiated from the antenna 221.

Next, after the signal received from the antenna 222 of the receiver is amplified in the amplifier 1516, it is demodulated in the narrowband demodulation unit 1515. Then, the carrier detection unit 1513 judges whether the signal is the CS signal or not, and in the case it is a CS signal, the carrier detection unit 1513 notifies the communication data selection unit 202 of this.

When the communication data selection unit 202 judges that the signal is control information addressed to the communication data selection unit 202, it controls the power supply switch 1517 to supply power to the wideband demodulation unit 1514 and the data decoding unit 1512 to put them into the operating mode.

Next, the communication data generation unit 1520 of the transmitter instructs the data generation unit 1503 to transmit data.

The data generation unit 1503 generates a data frame to be outputted to the second impulse waveform generation unit 1605.

The second impulse waveform generation unit 1605 slices the pulse width of the oscillator 1607 into an impulse with width of "τ2". In this way, an UWB signal is generated.

After that, the UWB signal is amplified in the amplifier 1506, and then radiated from the antenna 221.

After the signal received from the antenna 222 of the receiver is amplified in the amplifier 1516, the signal is demodulated in the wideband demodulation unit 1514. The demodulated signal is decoded in the data decoding unit 1512, and then transmitted to the communication data selection unit 202. When the communication data selection unit 202 recognizes the received data as a communication message, the data is transmitted to the application unit 203 to complete reception processing.

As described above, according to the embodiment, the transmitter easily modulates control information or data into the UWB signals having bandwidths corresponding to the impulse widths "τ1" and "τ2" respectively. That is to say, in the radio communication device according to the invention in which the modulation method is made UWB by impulse radio, the wideband modulated signal controls the oscillator as an impulse signal having a narrow pulse width, and the narrowband modulated signal controls the oscillator as an impulse signal having a wide pulse width, therefore, the UWB signals having bandwidths of the wideband and the narrowband can be generated.

According to the embodiment, during waiting time for the CS signal which occupies most of the communication time, the receiver puts the wideband demodulation unit in a sleep mode and operates the narrowband demodulation unit, whose power consumption is low, thereby realizing a receiver in which power consumption is low as a whole.

In the embodiment, control information is written in the carrier sense signal, but a carrier sense signal which does not include control information is possible. In this case, the wideband demodulation unit and the data decoding unit is released from the power saving mode when they receive a carrier sense signal in the narrowband channel, regardless of whether it is a carrier sense signal addressed to them or not, and the reception in a wideband channel becomes possible.

In the embodiment, explanation was made of use of the carrier sense signal, but this can be replaced by a preamble. Accordingly, the same as the embodiment can be realized in various protocols.

Embodiment 4

A configuration of a radio communication device according to the embodiment will be explained with reference to the drawings.

Figure 15:
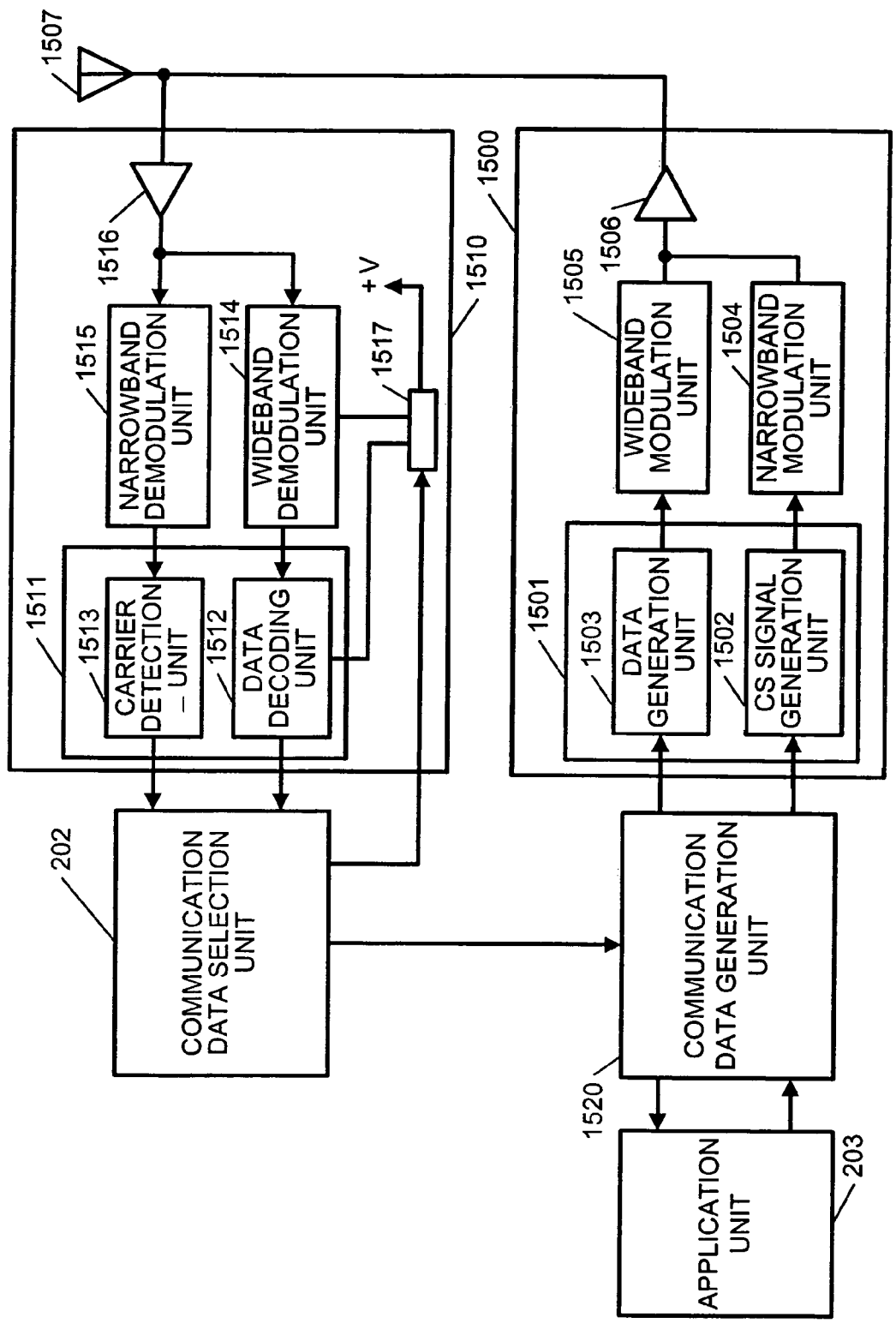
FIG. 15 is a diagram showing a configuration of a radio communication device according to an embodiment 4 of the invention.

FIG. 15 is a block diagram explaining in detail a transmission function unit including the transmitting unit 211 and the narrowband transmitting unit 1401 and a reception function unit including the receiving unit 201 and the narrowband receiving unit 1402 of the radio communication device shown in FIG. 14 of the embodiment 2 of the invention.

In FIG. 15, a transmission function unit 1500 is connected to an antenna 1507 which transmits radio signals, including a transmission signal generation unit 1501 having the CS signal generation unit 1502 and the data generation unit 1503, a narrowband modulation unit 1504, a wideband modulation unit 1505, and the amplifier 1506.

The CS signal generation unit 1502 in the transmission signal generation unit 1501 generates a carrier sense signal (CS signal), and the data generation unit 1503 generates a data signal as appropriate.

The wideband modulation unit 1505 modulates an inputted signal to a wideband signal such as UWB. The wideband modulation unit 1505 comprises the second transmitting unit of the invention.

The narrowband modulation unit 1504 modulates an inputted signal to a signal having a narrower band than the wideband signal. By setting the modulation rate to be less than or equal to a predetermined value, the operation rate of elements included in the narrowband modulation unit 1504 can be set low. Accordingly, power consumption in the narrowband modulation unit 1504 can be less than or equal to a predetermined value. The narrowband modulation unit 1504 comprises first transmitting unit of the invention.

The amplifier 1506 supplies a radio signal 1009 amplified to the amplitude required for transmission by the antenna 1507, which is radiated into space.

The CS signal generation unit 1502 and the narrowband modulation unit 1504 comprise the narrowband transmitting unit 1401, and the data generation unit 1503 and the wideband modulation unit 1505 comprise the transmitting unit 211 in FIG. 14 of the embodiment 2.

A reception function unit 1510 is connected to the antenna 1507 which receives the radio signal 1009, and includes the amplifier 1516, the narrowband demodulation unit 1515, the wideband demodulation unit 1514, a demodulation unit 1511 and the power supply switch 1517. The demodulation unit 1511 further includes the carrier detection unit 1513 and the data decoding unit 1512.

The amplifier 1516 amplifies a signal so that the signal supplied from the antenna 1507 has the amplitude required for reception processing.

The narrowband demodulation unit 1515 demodulates the reception signal when the reception signal is a signal of the narrowband modulation. By setting the modulation rate to be less than or equal to a predetermined value, the demodulation rate of the narrowband demodulation unit 1515 which demodulates the modulated signal can be also set to be less than or equal to the prescribed value. Therefore, the operation rate of elements included in the narrowband demodulation unit 1515 can be set low. Accordingly, power consumption in the narrowband demodulation unit 1515 can be limited to less than or equal to a predetermined value. The narrowband demodulation unit 1515 and the carrier detection unit 1513 comprise the first receiving unit of the invention.

The wideband demodulation unit 1514 demodulates the reception signal when the reception signal is a signal of the wideband modulation. The wideband demodulation unit 1514 and the data decoding unit 1512 comprise the second receiving unit of the invention.

The power supply switch 1517 is the switch which controls power supply to the data decoding unit 1512 and the wideband demodulation unit 1514. By stopping the power feeding, the data decoding unit 1512 and the wideband demodulation unit 1514 are put into a power saving mode.

The data decoding unit 1512, the wideband demodulation unit 1514 and the power supply switch 1517 correspond to the receiving unit 201 in FIG. 14 of the embodiment 2, and the carrier detection unit 1513 and the narrowband demodulation unit 1515 correspond to the narrowband receiving unit 1402.

Further, the communication data generation unit 1520 corresponds to the communication data generation unit 210, the communication/response information generation unit 207, the communication information analysis unit 204, the event timer 209, the communication prohibition table 205 and the communication reservation table 206 in FIG. 14.

Operations of the radio communication device thus configured according to the embodiment will be explained with reference to FIG. 17 and FIG. 18.

Figure 17:
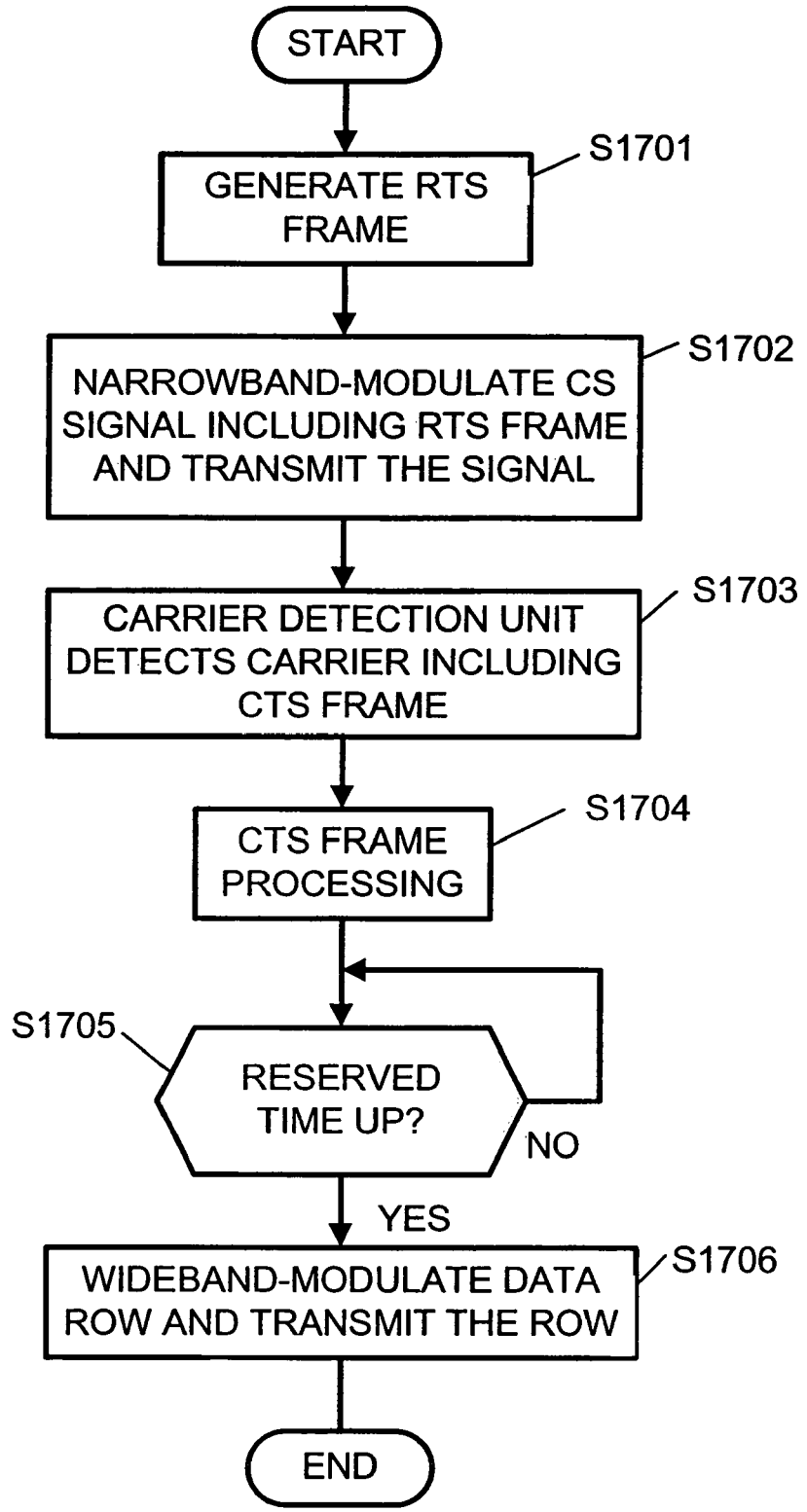
FIG. 17 is a flow chart showing transmission processing performed by a radio communication device which is transmitting data according to an embodiment 3 of the invention.
Figure 18:
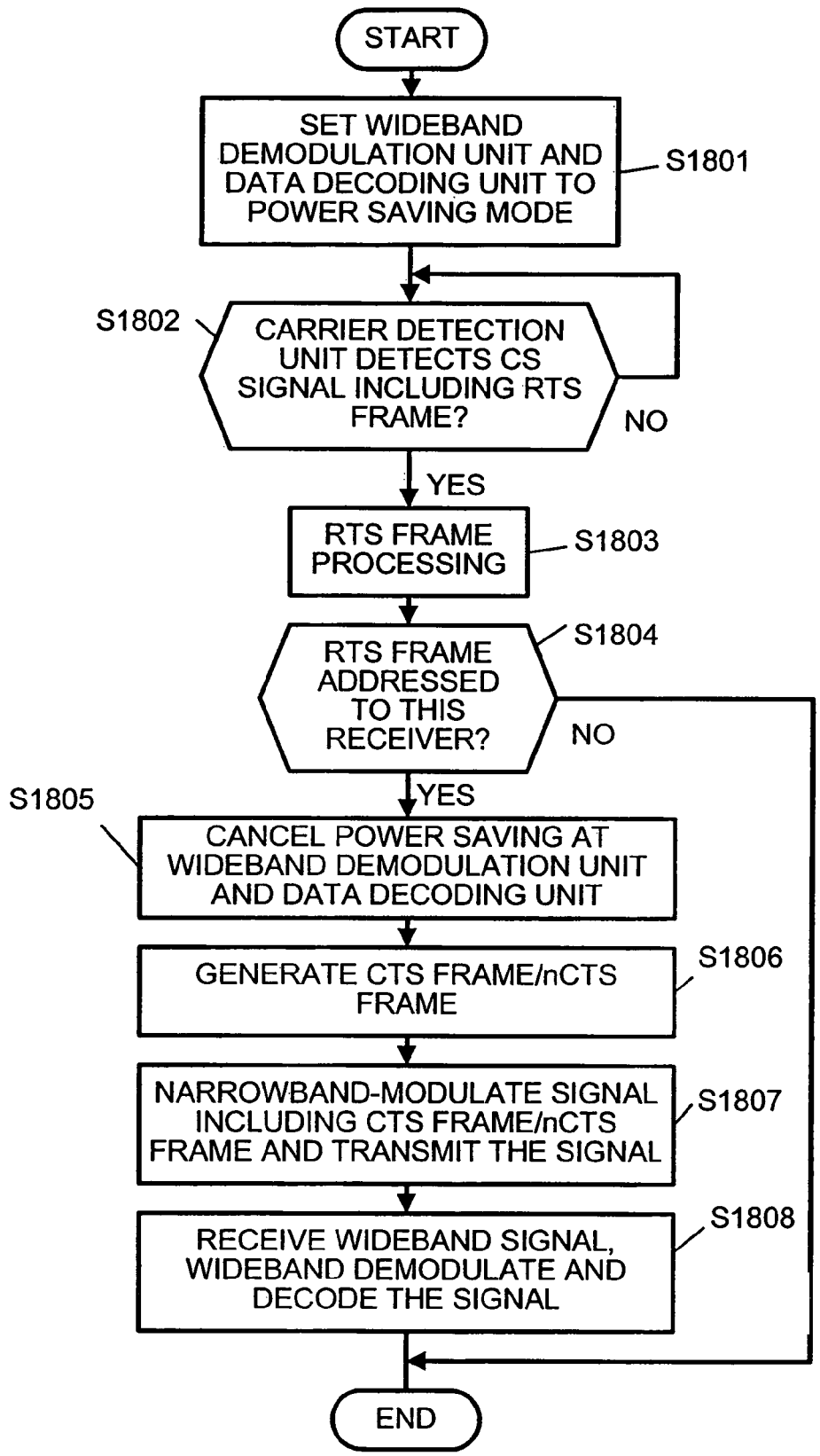
FIG. 18 is a flow chart showing reception processing performed by a radio communication device which is receiving data according to the embodiment 3 of the invention.

FIG. 17 is a flow chart showing transmission processing performed by the transmitting radio communication device, and FIG. 18 is a flow chart showing reception processing performed by the receiving radio communication device.

The transmission signal generation unit 1501 of the radio communication device, when transmitting the CS signal in a CSMA/CA communication, supplies the CS signal from the CS signal generation unit 1502 to the narrowband demodulation unit 1504. In the same way as the embodiment 1, when the communication data generation unit 1520 receives from the application unit 203 a request to transmit communication message data to another radio communication device, communication data generation unit 1520 generates an RTS frame in which the transmission start time and the transmission occupied time slot for reserving communication time are written, and transmits it to the CS signal generation unit 1502 (step S1701). The CS signal generation unit 1502 supplies the CS signal including the generated RTS frame to the narrowband modulation unit 1504. The narrowband modulation unit 1504 receives the signal and modulates it into a narrowband signal, outputting the narrowband modulated signal to the amplifier 1506. The amplifier 1506 amplifies the narrowband modulated signal, and then transmits it from the antenna 1507 as the radio signal 1009 (Step S1702).

On the other hand, in the reception function unit 1510, the narrowband demodulation unit 1515 and the carrier detection unit 1513 are always in the operating mode. However, the power source supply for the wideband demodulation unit 1514 and the data decoding unit 1512 are stopped by the power supply switch 1517, which are in a so-called sleep mode (or power saving mode) (step S1801). After the reception function unit 1510 amplifies the signal received from the antenna 1507 in the amplifier 1516, the unit demodulates the signal in the narrowband demodulation unit 1515. Then, the carrier detection unit 1513 judges whether the signal is a CS signal or not (step S1802).

If the signal is a CS signal, the communication data selection unit 202 is notified. Also, if an RTS frame is included in the carrier, the signal is transmitted to the communication data selection unit 202 and the RTS frame processing shown in FIG. 13 is performed in the same way as the embodiment 1 (step S1803).

Further, if the communication data selection unit 202 receives a carrier including the communication time reservation information which is addressed to the communication data selection unit 202 (step S1804), it controls the power supply switch 1517 so as to supply power source to the wideband demodulation unit 1514 and the data decoding unit 1512, putting them in the operating mode (step S1805). The transmission of the CTS frame or nCTS frame performed in the RTS frame processing is performed in the same way as the transmission of the RTS frame performed by the transmission function unit 1501. That is to say, the communication data generation unit 1520 generates a CTS frame or nCTS frame (step S1806), and the narrowband signal including the CTS frame or the nCTS frame in the carrier from the CS signal generation unit 1502 is transmitted (step S1807). Accordingly, the carrier detection unit 1513 of the reception function unit 1510 receives the carrier including the CTS frame or the nCTS frame (step S1703). Then, the carrier detection unit 1513 transmits the CTS frame to the communication data selection unit 202, and the communication data selection unit 202 performs the CTS frame processing shown in FIG. 12 (step S1704).

As a result, when the communication data generation unit 1520 is notified that the reception is possible from the communication data selection unit 202, the communication data generation unit 1520 generates a data row in the data generation unit 1503 in accordance with the communication reservation (step S1705) in the same way as the embodiment 1. The wideband modulation unit 1505 modulates the data row, and amplifies it in the amplifier 1506, then, transmits the data row from the antenna 1507 as the radio signal 1009 (step S1706).

On the other hand, in the reception function unit 1510, when the data decoding unit 1512 and the wideband demodulation unit 1514 are in the operating mode, the wideband signal received from antenna 1507 is amplified in the amplifier 1516, and then the wideband demodulation unit 1514 performs demodulation processing. After that, the data decoding unit 1512 decodes the wideband demodulated signal and transmits it to the communication data selection unit 202 (step S1808). If the communication data selection unit 202 recognizes the received data as a communication message, the data is transmitted to the application unit 203 to complete reception processing.

Figure 7:
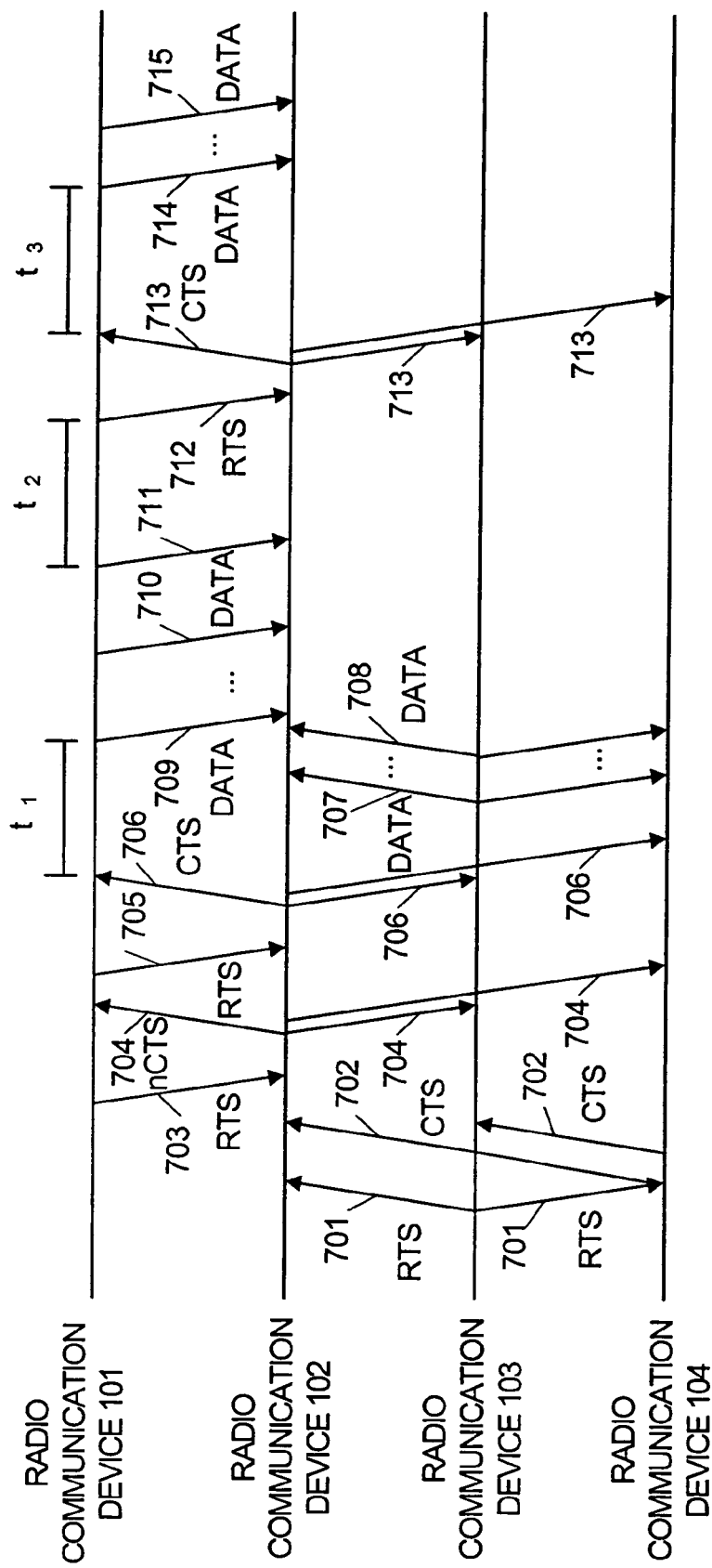
FIG. 7 is a diagram showing communication sequences between radio communication devices according to the embodiment 1 of the invention.

The data transmission and reception operations operating as above between the radio communication devices 101, 102, 103 and 104 are same as the operations of the embodiment 1 shown in FIG. 7, but they are different in that carrier signals 701, 703 and 705 including the RTS frame, and signals 702, 704, and 706 including the CTS frame or the nCTS frame are narrowband signals, and data signals 707 to 712 are wideband signals.

The wideband modulation unit 1505 can make high-speed communication by applying a wideband modulation method such as UWB. The narrowband modulation unit 1504 can make communication with low power consumption though it is low-speed by applying a narrowband modulation method.

Generally, in the CSMA/CA communication, the carrier sense time in the reception waiting time often occupies most of the whole communication time, and in transmission and reception of the CS signal, the high-speed communication is not always necessary.

Therefore, according to the configuration shown in the embodiment, a radio communication device with low power consumption overall can be realized by putting the wideband demodulation unit in the sleep mode and operating the narrowband demodulation unit, whose power consumption is lower than the wideband demodulation unit, during the waiting time for the carrier signal which occupies most of the communication time.

In the above explanations, if the communication data selection unit 202 receives a carrier which includes communication time reservation information and which is addressed to the communication data selection unit 202, it controls the power supply switch 1517 to supply power source to the wideband demodulation unit 1514 and the data decoding unit 1512, but it is not limited to this. It is possible to control the power supply switch 1517 so that the wideband demodulation unit 1514 and the data decoding unit 1512 are given power only at the time slot of communication reservation which is recorded in the communication reservation table 206. In this case, the operation time of the wideband demodulation unit 1514 and the data decoding unit 1512 can be made the shortest possible, and as a result, power consumption of the radio communication device can be much further reduced.

Embodiment 5

A configuration of a radio communication device according to the embodiment will be explained with reference to the drawings.

Figure 16:
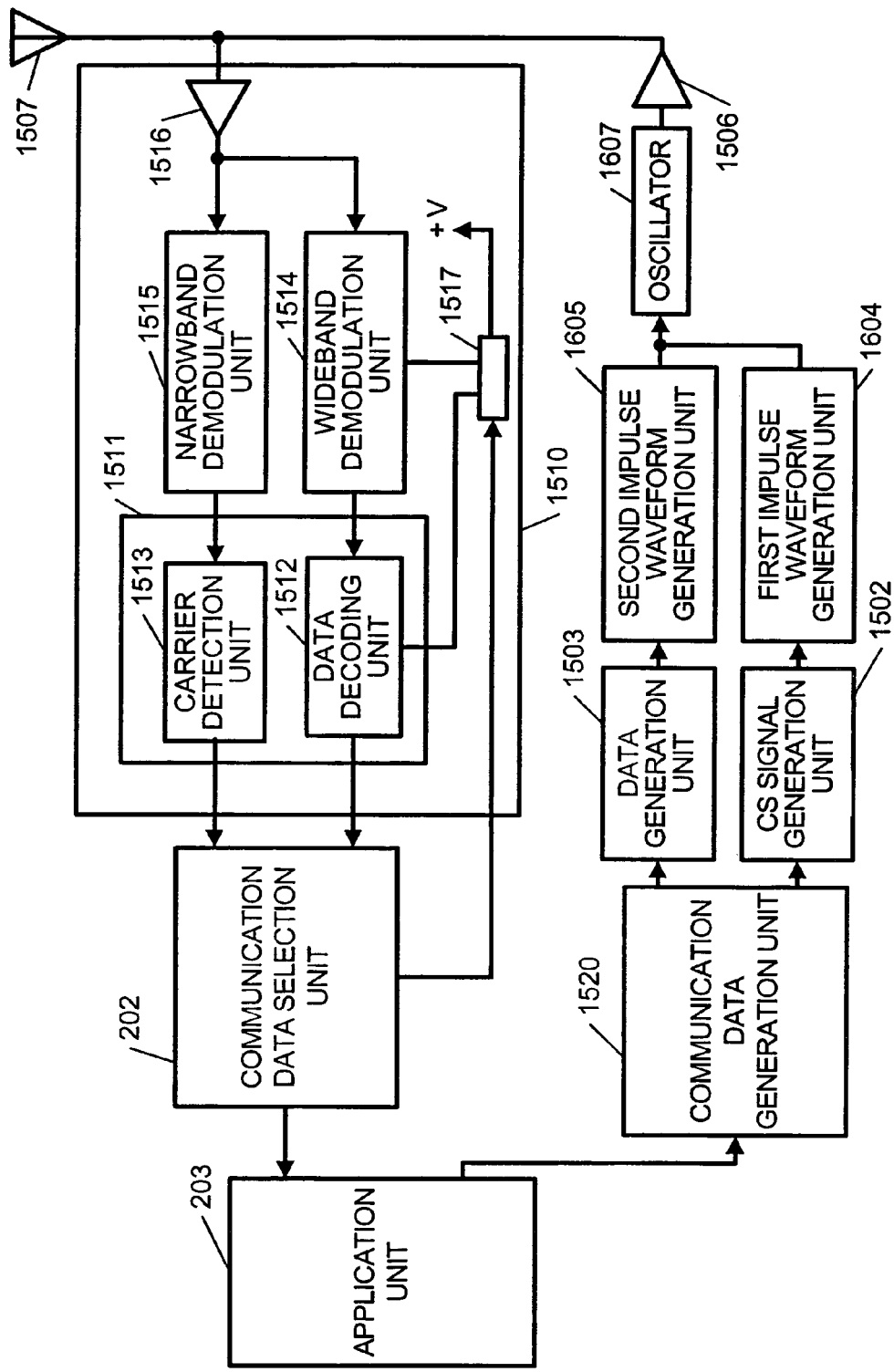
FIG. 16 is a diagram showing a configuration of a radio communication device according to an embodiment 4 of the invention.

FIG. 16 is a block diagram in the embodiment 5 of the invention, showing another configuration corresponding to the narrowband modulation unit 1504 and the wideband modulation unit 1505 of the radio communication device shown in FIG. 15.

In FIG. 16, the radio communication device differs from that of the embodiment 4 in that the first impulse waveform generation unit 1604, the second impulse waveform generation unit 1605 and the oscillator 1607 are included instead of the narrowband modulation unit 1504 and the wideband modulation unit 1505 in FIG. 15.

The first impulse waveform generation unit 1604 supplies an impulse waveform which is modulated by a CS signal having an impulse width of "τ1" to the oscillator 1607.

The second impulse waveform generation unit 1605 supplies an impulse waveform which is modulated by a data signal having an impulse width of "τ2" to the oscillator 1607.

The pulse width "τ1" is set to be wider than the pulse width "τ2".

The oscillator 1607 outputs an oscillation signal according to the inputted impulse waveform. The oscillation signal is an UWB signal which is prescribed by the impulse width of the inputted impulse signal.

According to the above configuration, by slicing the signals from the CS signal generation unit 1502 and the data generation unit 1503 into the impulse widths "τ1" and "τ2" of the impulse waveform generation unit 1604 and the second impulse waveform generation unit 1605, resulting in the pulse widths of the oscillator 1607, the signals can be easily modulated into UWB signals having bandwidths corresponding to the impulse widths "τ1" and "τ2" respectively. That is to say, according to the invention, the radio communication device in which the modulation method is UWB using impulse radio generates UWB signals changing between wideband and narrowband bandwidths by controlling the oscillator, using a wideband modulation signal as a impulse signal having a narrow pulse width and by controlling the oscillator using the narrowband modulation signal as the impulse signal having the wide pulse width. Other configurations and operations are same as the ones of embodiment 4.

As described above, according to the embodiment, the radio communication device in which the modulation method is UWB using impulse radio can make communication with narrowband signals when waiting for the carrier signal, and can make communication with wideband signals at the time of data communication, switching the bandwidth through a simple device configuration. Therefore, the radio communication device according to the embodiment can be a radio communication device with low power consumption as a whole.

INDUSTRIAL APPLICABILITY

The invention is a useful radio communication method and radio communication device when performing ad hoc communication, suitable for avoiding communication collision with other radio communication devices, and also for reducing power consumption when in the reception waiting mode.

The invention claimed is:

1. A radio communication method including, a first channel in which a first radio communication device and a second radio communication device which are Ultra Wide Band (UWB) radio communication devices perform data communication, and which is in a sleep mode at an initial stage, and also a second channel in which communication is always possible, and which has lower power consumption than the first channel, comprising:

a step in which the first radio communication device transmits control information to the second radio communication device in the second channel, the control information including communication time reservation request information in which a time slot when data transmission will be performed is written;

a step in which the second radio communication device receives the control information in the second channel and puts the first channel in a data reception operating mode;

a step in which after transmitting and receiving of data are performed in the first channel between the first radio communication device and the second radio communication device, the reception in the first channel is returned to the sleep mode;

a step in which if the communication time reservation request information included in the received control information is addressed to the second radio communication device, in the second channel it transmits communication time reservation response information in which information notifying that communication reservation addressed to the second radio communication device has been received is added to the communication time reservation request information;

a step in which a third radio communication device located in an area where communication is possible with the first radio communication device or the second radio communication device or both receives in the second channel:

a) the communication time reservation request information from the first radio communication device, and stores the time slot written in the communication time reservation request information as a transmission prohibition time slot, together with an identifier of the first radio communication device and an identifier of the second radio communication device in a communication prohibition table, and b) the communication time reservation response information from the second radio communication device,
if the time slot and identifiers are not already stored in the communication prohibition table, the third radio communication device stores the time slot written in the communication time reservation response information as the transmission prohibition time slot, together with the identifier of the first radio communication device and the identifier of the second radio communication device in the communication prohibition table, and
if the time slot and identifiers are already stored in the communication prohibition table, the third radio communication device does not store the time slot and identifiers included in the communication time reservation response information; and a step in which the third radio communication device decides a time slot in which its own transmission and reception are possible, based on the communication prohibition table, and wherein the first radio communication device transmits data using the second channel in the time slot designated by the communication time reservation request information.

2. The radio communication method according to claim 1, wherein both the first radio communication device and the second radio communication device are UWB radio communication devices, and in which the first channel is a wideband transmission channel and the second channel is a narrowband transmission channel whose modulation and demodulation rates are set to be less than or equal to a predetermined value.

3. The radio communication method according to claim 1, further comprising:
a step in which the second radio communication device requests the first radio communication device to transmit communication time reservation request information using the second channel, and
wherein the first radio communication device transmits the control information in response to the request from the second radio communication device in either the first channel or the second channel.

4. The radio communication method according to claim 1, wherein the first radio communication device further performs multicasting to the second radio communication device in the second channel.

5. A second radio communication device communicating with a first communication device and a third communication device, the second communication device comprising:
a first receiving unit receiving a preamble in a narrowband channel in which reception is always possible, the first receiving unit receiving control information from the first radio communication device including communication time reservation request information in which a time slot when data transmission will be performed;
a second receiving unit receiving data in an Ultra Wide Band (UWB) channel, and which can save power; and
a communication data selection unit controlling the power saving in said second receiving unit in the case where the communication data selection unit receives the preamble from said first receiving unit, and
wherein said communication data selection unit puts said second receiving unit in a power saving mode, and when said communication data selection unit receives the preamble from said first receiving unit, said communication data selection unit cancels the power saving mode in said second receiving unit and conducts reception of data in the UWB channel,
wherein the communication time reservation request information included in the received control information is addressed to the second radio communication device, in the narrowband channel it transmits communication time reservation response information in which information notifying that communication reservation addressed to the second radio communication device has been received is added to the communication time reservation request information,
wherein the third radio communication device located in an area where communication is possible with the first radio communication device or the second radio communication device or both receives in the narrowband channel:
a) the communication time reservation request information from the first radio communication device, and stores the time slot written in the communication time reservation request information as a transmission prohibition time slot, together with an identifier of the first radio communication device and an identifier of the second radio communication device in a communication prohibition table, and or the
b) the communication time reservation response information from the second radio communication device,
if the time slot and identifiers are not already stored in the communication prohibition table, the third radio communication device stores the time slot written in the communication time reservation response information as the transmission prohibition time slot, together with the identifier of the first radio communication device and the identifier of the second radio communication device in the communication prohibition table, and if the time slot and identifiers are already stored in the communication prohibition table, the third radio communication device does not store the time slot and identifiers included in the communication time reservation response information; and wherein the third radio communication device decides a time slot in which its own transmission and reception are possible, based on the communication prohibition table, and wherein the first radio communication device transmits data using the narrowband channel in the time slot designated by the communication time reservation request information.

6. A second radio communication device communicating with a first communication device and a third communication device, the second communication device comprising:

a first receiving unit receiving control information in a narrowband channel in which reception is always possible, the first receiving unit receiving control information from the first radio communication device including communication time reservation request information in which a time slot when data transmission will be performed;

a second receiving unit which receives data in an Ultra Wide Band (UWB) channel, and which can save power;

a communication data selection unit controlling the power saving in said second receiving unit by judging whether the control information received by said first receiving unit is addressed to that receiver or not, and wherein said communication data selection unit puts said second receiving unit in a power saving mode, and cancels the power saving in said second receiving unit when said communication data selection unit receives control information addressed to said communication data selection unit from said first receiving unit to receive data in the UWB channel, wherein the communication time reservation request information included in the received control information is addressed to the second radio communication device, in the narrowband channel it transmits communication time reservation response information in which information notifying that communication reservation addressed to the second radio communication device has been received is added to the communication time reservation request information, wherein the third radio communication device located in an area where communication is possible with the first radio communication device or the second radio communication device or both receives in the narrowband channel:

a) the communication time reservation request information from the first radio communication device, and stores the time slot written in the communication time reservation request information as a transmission prohibition time slot, together with an identifier of the first radio communication device and an identifier of the second radio communication device in a communication prohibition table, and b) the communication time reservation response information from the second radio communication device, if the time slot and identifiers are not already stored in the communication prohibition table, the third radio communication device stores the time slot written in the communication time reservation response information as the transmission prohibition time slot, together with the identifier of the first radio communication device and the identifier of the second radio communication device in the communication prohibition table, and if the time slot and identifiers are already stored in the communication prohibition table, the third radio communication device does not store the time slot and identifiers included in the communication time reservation response information; and wherein the third radio communication device decides a time slot in which its own transmission and reception are possible, based on the communication prohibition table, and wherein the first radio communication device transmits data using the narrowband channel in the time slot designated by the communication time reservation request information.

\* \* \* \* \*

UNITED STATES PATENT AND TRADEMARK OFFICE
CERTIFICATE OF CORRECTION

PATENT NO. : 7,787,493 B2
APPLICATION NO. : 10/573506
DATED : August 31, 2010
INVENTOR(S) : Hiroshi Doi et al.

It is certified that error appears in the above-identified patent and that said Letters Patent is hereby corrected as shown below:

At Column 24, claim 5, line 59, "table, and or the" should read --table, and-- as indicated in the amendment filed February 5, 2010.

Signed and Sealed this

Twenty-first Day of December, 2010

David J. Kappos
*Director of the United States Patent and Trademark Office*